United States Patent Office 3,097,209
Patented July 9, 1963

3,097,209
1-AROYALKYL-4-ARYLPIPERIDINE-CARBOXAMIDES
Paul A. J. Janssen, Vosselaar, near Turnhout, Belgium, assignor to Research Laboratorium Dr. C. Janssen, N.V., Beerse, Belgium, a company of Belgium
No Drawing. Filed Mar. 14, 1960, Ser. No. 14,570
16 Claims. (Cl. 260—293.4)

The present invention relates to a novel group of 1-aroylalkyl-4-arylpiperidinecarboxamides of the structural formula

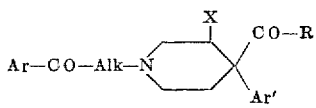

wherein Ar is a member of the class consisting of phenyl, lower alkylphenyl, xylyl, halophenyl, methoxyphenyl, and thienyl radicals; Ar' is a member of the class consisting of phenyl, lower alkylphenyl, xylyl, halophenyl, methoxyphenyl, and trifluoromethylphenyl radicals; Alk is a lower alkylene radical of at least 3 carbon atoms; X is a member of the class consisting of hydrogen and the methyl radical; and R is a member of the class consisting of a primary, secondary, or tertiary amino radical.

Typical examples of the lower alkylphenyl groups which Ar and Ar' can represent are tolyl, ethylphenyl, cumyl, and the like.

The radical Alk represents a lower alkylene radical of at least 3 carbon atoms including trimethylene, propylene, butylene, methylpropylene, tetramethylene, and pentamethylene. An especially preferred embodiment of this invention is represented by the compounds in which Alk is a trimethylene radical.

The primary, secondary, and tertiary amino radicals which R can represent are members of the class consisting of —NH$_2$, —N(CH$_3$)-phenyl, anilino, benzylamino, pyrrolidino, piperidino, morpholino, methylmorpholino, dimethylmorpholino, piperazino, and phenylpiperazino radicals. R can also represent radicals of the formula NH(lower alkyl) and N(lower alkyl)$_2$, wherein the lower alkyl radical represents methyl, ethyl, straight-chain or branched propyl, butyl, amyl, or hexyl.

The compounds described herein have potent biological effects as apomorphine inhibitors and barbiturate potentiators. At therapeutic levels they produce little or no Parkinson-like side effects, hypnosis, and cortical inhibition. They are thus highly useful as selective anti-vomiting agents.

The organic bases of this invention form pharmaceutically acceptable salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The compounds of this invention are prepared by the condensation of an aroylalkyl halide of the formula Ar—CO—Alk—Halogen with an appropriately selected 4-arylpiperidine carboxamide

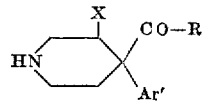

to produce a compound of the formula

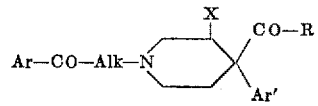

where Alk, Ar, Ar', R, and X are defined as above. The reaction can be carried out in an inert solvent such as an aromatic hydrocarbon e.g. benzene, toluene, xylene, a lower alkanol e.g. ethanol, propanol, butanol, or a lower alkanone e.g. acetone, butanone, pentanone, or hexanone. A particularly useful solvent for the preparation is the 4-methyl-2-pentanone. The reaction carried out can be accelerated by use of elevated temperatures.

The aroylalkyl halides used as intermediates can be prepared conveniently by the Friedel-Crafts reaction including its milder variation employing, for example, γ-chlorobutyryl chloride and benzene or an appropriately substituted benzene such as toluene and xylene, a halogenated benzene such as chlorobenzene, bromobenzene, and fluorobenzene, or an alkoxybenzene such as anisole and phenetole.

These intermediates can also be prepared by treating an ω-haloalkanonitrile with the appropriate arylmagenesium bromide followed by acid hydrolysis of the adduct.

The compounds of the formula

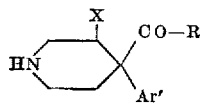

wherein Ar', R, and X are defined as above, which are used as intermediates in the process described above, are prepared by the following reaction schemes.

First a mixture of one mole of a compound of the formula

HO—CH$_2$—CH$_2$—NH—CH$_2$—CH(X)—OH and 0.5 mole of sodium carbonate in 2-N aqueous solution is heated at about 70–95° C. At that temperature is added one mole of a compound of the formula Y—Cl, wherein X is defined as above and Y is a radical capable of blocking the nitrogen atom such as p-toluenesulfonyl or benzyl. This mixture is then heated to about 95° C. for one hour. After extraction with ether, the solvent is evaporated and the residue is dissolved in 2-propanol. Ether is added and the mixture is chilled. The solid which precipitates is collected on a filter and dried to yield a compound of the formula

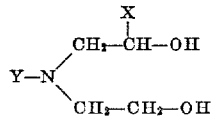

wherein X and Y are defined as above.

When X is defined as a methyl radical and Y is a 4-toluenesulfonyl radical, the compound can be purified by chilling in a 1:3 by volume mixture of ethanol and acetone. N-(β-hydroxyethyl) - N - (β - hydroxypropyl)-4-toluenesulfamide thus obtained melts at about 66.2–68.2° C.

A mixture of 1.73 moles of the foregoing product and 6 moles of thionyl chloride is heated to about 125° C. for one hour and then cooled. The excess thionyl chloride is evaporated and the residue is dissolved in toluene, filtered, and evaporated to yield a compound of the formula $$Y-N\begin{matrix}CH_2-CH-Cl\\ \\ CH_2-CH_2-Cl\end{matrix}$$

wherein Y and X are defined as above. (Where Y is a benzyl radical, this compound is obtained as the hydrochloride.)

A mixture of 0.46 mole of the dichloro compound formed above in about 2.5 moles of toluene and one mole of sodamide is heated at about 45° C. Then about 0.43 mole of a nitrile of the formula $$Ar'-CH_2-CN$$

is added portionwise to control the exothermic reaction. (Where Ar' is thienyl, a slightly different method of combining the starting materials is employed. To a stirred and cooled suspension of sodamide in toluene is added the nitrile of the formula $$\begin{matrix}\\ S\end{matrix}-CH_2-CN$$

Then a solution of the dichloro compound in toluene is added portionwise to this mixture. The temperature is then allowed to rise to about 47° C. and the following procedure employed.) This mixture is heated slowly to reflux and maintained at that temperature for a period of 1 to 5 hours. After cooling to 0° C. the mixture is decomposed with water. The solid precipitate is collected on a filter and dried to yield a compound of the formula $$Y-N\begin{matrix}X\\ \\ \end{matrix}\begin{matrix}CN\\ \\ Ar'\end{matrix}$$

where Y, X, and Ar' are defined as above.

The compounds in which X is hydrogen can be purified by crystallization from water and methanol. In the case where Y is benzyl, the hydrochlorides of these compounds may be prepared by treating a solution of the compound with hydrogen chloride gas and collecting the precipitate. Typical compounds then demonstrate the following physical constants.

1-benzyl-4-cyano-4-(3 - tolyl)piperidine hydrochloride, melting at about 247.5–249.3° C.

1-benzyl-4-cyano-4-(4 - tolyl)piperidine hydrochloride, melting at about 281.6–282.9° C.

1-(4-toluenesulfonyl)-4-cyano-4 - (3 - chlorophenyl)-piperidine, melting at about 179.6–180.4° C.

1-(4-toluenesulfonyl)-4-cyano-4-(3-tolyl) - piperidine, melting at about 190–191° C.

1 - (4-toluenesufonyl)-4-cyano-4-(2-thienyl)-piperidine, melting at about 149.8–160° C. with decomposition.

Where X is a methyl radical, two optically active steroisomers are formed. Exactly the same procedure for the preparation of these compounds is followed as outlined above. The isomers are separated by fractional crystallization, typically from acetone. In the following description the isomer which is obtained in the initial crops of this fractional crystallization is called α and the second isomer obtained is called the β isomer. This terminology has no bearing on the actual configuration of the molecule. Typical compounds obtained in this manner are:

1-(4-toluenesulfonyl)-3α-methyl-4-cyano-4-(4 - chlorophenyl)piperidine, melting at about 205–206° C.

1-(4-toluenesulfonyl)-3α-methyl-4-cyano-4-(4 - fluorophenyl)piperidine, melting at about 141.8–142.8° C.

1-(4-toluenesulfonyl)-3β-methyl-4-cyano-4-(4 - fluorophenyl)piperidine, melting at about 204.5–205.5° C.

1-(4-toluenesulfonyl)-3α-methyl-4-cyano-4-(4 - tolyl)-piperidine, melting at about 209.5–210.2° C.

1 - (4 - toluenesulfonyl) - 3α - methyl - 4 - cyano - 4 - phenylpiperidine, melting at about 146.2–148° C.

1 - (4 - toluenesulfonyl) - 3β - methyl - 4 - cyano - 4-phenylpiperidine, melting at about 217–218° C.

The foregoing nitriles can be hydrolyzed directly with acid to yield the carboxamides. In this process a mixture of 6 parts of the nitrile, 18 parts of concentrated sulfuric acid, and about one part of water is heated for about 15 hours at about 100° C. The mixture is then poured into ice water, rendered alkaline, and extracted with chloroform. The extract is dried to yield the base of the compound of the formula $$HN\begin{matrix}X\\ \\ \end{matrix}\begin{matrix}CH-NH_2\\ \\ Ar'\end{matrix}$$

Where the hydrochloride is desired, the base is dissolved in a suitable organic solvent such as acetone and ether. The solution is then saturated with hydrogen chloride gas. The hydrochloride which precipitates can then be purified by recrystallization from 2-propanol. Compounds obtained in this manner are:

3α - methyl - 4 - phenylpiperidine - 4 - carboxamide hydrochloride, melting at about 206.5–211° C.

3β - methyl - 4 - phenylpiperidine - 4 - carboxamide, melting at about 190–192.8° C.

3β - methyl - 4 - phenylpiperidine - 4 - carboxamide hydrochloride, melting at about 296.5–299° C.

For the preparation of substituted amides another reaction sequence is employed. A mixture of one part of the above-illustrated nitrile, one part of potassium hydroxide, and 10 parts of a suitable solvent such as methanol, ethanol, or ethylene glycol is heated in an autoclave for about 9 hours at a temperature of about 180° C. After cooling the mixture is decolorized and then evaporated. The residue is dissolved in water and the solution rendered acidic. The solid which precipitates is collected on a filter and then purified with boiling water to yield the acid of the formula $$Y-N\begin{matrix}X\\ \\ \end{matrix}\begin{matrix}COOH\\ \\ Ar'\end{matrix}$$

The compounds obtained in this manner are:

1 - (4 - toluenesulfonyl) - 3α - methyl - 4 - phenyl-4-carboxypiperidine, melting at about 173.5–175° C.

1 - (4 - toluenesulfonyl) - 3β - methyl - 4 - phenyl-4-carboxypiperidine, melting at about 209.5–211.4° C.

1 - (4 -toluenesulfonyl) - 4 - (2 - thienyl) - 4 - carboxypiperidine, melting at about 216.6–219° C.

1 - (4 - toluenesulfonyl) - 3α - methyl - 4 - (4 - chlorophenyl)-4-carboxypiperidine, melting at about 117–179° C.

1 - (4 - toluenesulfonyl) - 4 - (4 - chlorophenyl) - 4-carboxypiperidine, melting at about 221–222.5° C.

1 - (4 - toluenesulfonyl) - 4 - (4 - tolyl) - 4 - carboxypiperidine, melting at about 226.5–228.5° C.

1 - benzyl - 4 - (4 - tolyl) - 4 - carboxypiperidine, melting at about 280–283° C.

1 - benzyl - 4 - (4 - chlorophenyl) - 4 - carboxypiperidine hydrochloride, melting at about 257.9–261° C.

When Y is benzyl the substituted amides are made by refluxing 0.25 mole of the acid prepared above and 2 moles of thionyl chloride for about 2 hours. After evaporation of the excess thionyl chloride, the residue is treated with benzene. The solid precipitate is collected on a filter, finely divided and then suspended in benzene. The suspension is cooled and then 1.25 moles of a compound of the formula HR, wherein R is defined as above, is added portionwise during the course of 15 minutes. The mixture is then allowed to come to room temperature, stirred for 12 hours and then rendered alkaline. After extraction with a benzene-ether mixture, the extract is dried and evaporated. The solid residue is a compound of the formula

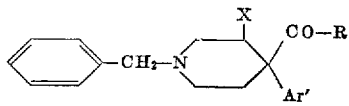

where Ar', R, and X are defined as above. The following typical compounds are obtained in this manner:

1 - benzyl - 4 - (4 - tolyl) - 4 - carboxypiperidine morpholide, melting at about 136.6–138.7° C.

1 - benzyl - 4 - (4 - tolyl)piperidine - 4 - N,N - dimethyl)-carboxamide, melting at about 136.4–140.1° C.

1 - benzyl - 4 - phenylpiperidine - 4 - (N - methyl - N-carboxyanilide hydrochloride, melting at about 220–221° C.

1 - benyl - 4 - (3 - tolyl) - 4 - carboxypiperidine pyrrolidide, melting at about 105–108° C.

1 - benzyl - 4 - (4 - tolyl) - 4 carboxypiperidine pyrrolidide, melting at about 155–156° C.

1 - benzyl - 4 - (3 - tolyl)piperidine - 4 - (N,N-dimethyl)carboxamide, melting at about 95.4–98.6° C.

1 - benzyl - 4 - phenyl - piperidine - 4 - (N,N-diethyl)-carboxamide, melting at about 73.4–74.6° C.

1 - benzyl - 4 - (3 - tolyl) - 4 - carboxypiperidine morpholide, melting at about 156–158° C.

1 - benzyl - 4 - (4 - tolyl) - 4 - carboxypiperidine piperidide, melting at about 121–121.5° C.

1 - benzyl - 4 - phenylpiperidine - 4 - (N - benzyl)-carboxamide, melting at about 129.5–130.5° C.

1 - benzyl - 4 - phenylpiperidine - 4 - (N - phenyl) - carboxamide hydrochloride, melting at about 261.0–262.5° C.

1 - benzyl - 4 - phenyl - 4 - carboxypiperidine pyrrolidide, melting at about 165.5–166.5° C.

1 - benzyl - 4 - phenyl - 4 - carboxypiperidine morpholide, melting at about 138.2–139.8° C.

1 - benzyl - 4 - phenyl - 4 - carboxypiperidine piperidide, melting at about 132.8–134° C.

1 - benzyl - 4 - phenylpiperidine - 4 - (N - methyl)-carboxamide, melting at about 135.2–136.4° C.

1 - benzyl - 4 phenylpiperidine - 4 - (N - tert. butyl) carboxamide, melting at about 127.4–128.2° C.

1 - benzyl - 4 - (4-chlorophenyl)piperidine-4-(N,N-dimethyl)carboxamide, melting at about 141–142.8° C.

1 - benzyl - 4 - phenylpiperidine-4-(N,N-dimethyl)-carboxamide, melting at about 137–138° C.

When Y is a 4-toluenesulfonyl radical the following reaction sequence is employed. A suspension of 0.25 mole of the acid

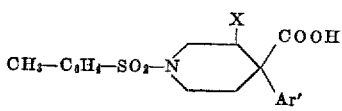

2 moles of thionyl chloride and 5 moles of benzene is refluxed for 2 hours, cooled, and filtered. After decolorizing with activated charcoal the solution is evaporated and the solid residue can be purified by trituration with petroleum ether. The compound has the formula

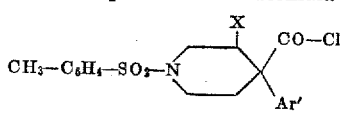

To a stirred solution of this acid halide in benzene is added portionwise under cooling 1.5 moles of a compound of the formula HR, where R is defined as above. After the addition is completed, the mixture is allowed to stand for 10 hours at room temperature and the solid which precipitates is collected to yield a compound of the formula

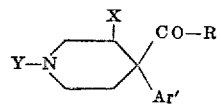

The following typical compounds are prepared in this manner:

1 - (4 - toluenesulfonyl)-3α-methyl-4-phenyl-piperidine-4-(N-methyl)carboxamide, melting at about 219.5–221.3° C.

1 - (4 - toluenesulfonyl)-4-(4-chlorophenyl)-piperidine-4-(N,N-dimethyl)carboxamide, melting at about 159.4–163° C.

1 - (4 - toluenesulfonyl)-4-(4-fluorophenyl)-4-carboxypiperidine pyrrolidide, melting at about 227–232° C.

1 - (4-toluenesulfonyl)-4-(4-methoxyphenyl)-4-carboxypiperidine pyrrolidide, melting at about 174.5–176° C.

1 - (4 - toluenesulfonyl)-4-(4-chlorophenyl)-4-carboxypiperidine pyrrolidide, melting at about 239.5–241.5° C.

1 - (4 - toluenesulfonyl-3α-methyl-4-phenyl-piperidine-4-(N,N-dimethyl)carboxamide, melting at about 186.6–187.4° C.

1 - (4 - toluenesulfonyl)-3β-methyl-4-phenyl-piperidine-4-(N,N-dimethyl)carboxamide, melting at about 194–195° C.

1 - (4 - toluenesulfonyl)-3β-methyl-4-phenyl-piperidine-4-(N,N-diethyl)carboxamide, melting at about 161.8–163° C.

1 - (4 - toluenesulfonyl)-3α-methyl-4-(4-chlorophenyl)-4-carboxypiperidine pyrrolidide, melting at about 152–154° C.

1 - (4 - toluenesulfonyl)-3β-methyl-4-phenyl-4-carboxypiperidine pyrrolidide, melting at about 184.2–185° C.

1 - (4 - toluenesulfonyl)-3β-methyl-4-phenyl-4-carboxypiperidine piperidide, melting at about 189.4–190° C.

1 - (4 - toluenesulfonyl)-3α-methyl-4-phenyl-4-carboxypiperidine morpholide, melting at about 149–150.5° C.

1 - (4 - toluenesulfonyl)-4-(2-thienyl)-4-carboxypiperidine.

1 - (4 - toluenesulfonyl)-3α-methyl-4-(4-chlorophenyl)-4-carboxypiperidine pyrrolidide.

1 - (4 - toluenesulfonyl)-4-(3-chlorophenyl)-piperidine-4-(N,N-dimethyl)carboxamide, melting at about 152–156° C.

1 - (4 - toluenesulfonyl)-4-(4 - ethylphenyl)-4-carboxypiperidine pyrrolidide, melting at about 131.2–133° C.

1 - (4-toluenesulfonyl) - 4 - (3 - methoxyphenyl)-4-carboxypiperidine pyrrolidide, melting at about 164.6–167.5° C. with decomposition.

1 - (4-toluenesulfonyl)-4-(4 - fluorophenyl)-4-carboxypiperidine morpholide, melting at about 219.5–221° C.

1 - (4-toluenesulfonyl) - 4 - (3-methoxyphenyl)-piperidine-4-(N,N-dimethyl)carboxamide, melting at about 147–151.6° C.

1 - (4-toluenesulfonyl)-4-(4-fluorophenyl)-piperidine-4-(N,N-dimethyl)carboxamide, melting at about 87–133° C.

The amides of the last preceding formula are conveniently converted to their analogs which are unsubstituted at the piperidine nitrogen by one of two procedures.

The first of the procedures to remove the blocking group Y is preferred where Y is a 4-toluenesulfonyl radical. A mixture of one part of the amide prepared above, one part of phenol, and 10 parts of a 30% solution of hydrogen bromide in acetic acid is stirred for about 20 hours at room temperature and then partitioned between ether and water. The aqueous solution is separated, rendered alkaline, and then extracted with chloroform. The chloroform extract is dried and then evaporated. The residue can be purified to yield the base of the formula

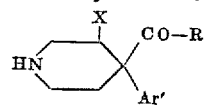

or can be dissolved in ether. The solution is saturated with hydrogen chloride gas. The solid hydrochloride which precipitates can then be collected on a filter. The following typical compounds can be obtained in this manner:

3α - methyl-4-phenylpiperidine-4-(N,N - dimethyl)-carboxamide hydrochloride, melting at about 252.4–255° C.

3α - methyl-4-phenyl-4-carboxypiperidine piperidide hydrochloride, melting at about 236.5–238.5° C.

3β - methyl-4-phenyl-4-carboxypiperidine morpholide, melting at about 111.5–114° C.

3α - methyl-4-phenyl-4-carboxypiperidine morpholide hydrochloride, melting at about 259.6–260.8° C.

3β - methyl-4-phenyl-4-carboxypiperidine piperidide hydrochloride, melting at about 255.8–257.6° C.

3β - methyl-4-phenyl - 4 - carboxypiperidine pyrrolidide, melting at about 129.2–132.4° C.

3α - methyl-4-phenyl - 4 - carboxypiperidine pyrrolidide hydrochloride, melting at about 247–249° C.

3β - methyl - 4 - phenylpiperidine-4-(N,N-diethyl)-carboxamide hydrochloride, melting at about 230–231° C.

3α - methyl-4-phenylpiperidine - 4 - (N,N-diethyl) - carboxamide hydrochloride, melting at about 243–245° C.

3β - methyl-4-phenylpiperidine-4-(N,N - dimethyl)-carboxamide, melting at about 123.8–124.6° C.

3α - methyl - 4 - (4 - chlorophenyl)-4-carboxypiperidine pyrrolidide hydrochloride, melting at about 268–270° C. with decomposition.

4 - (3-chlorophenyl)piperidine-4-(N,N - dimethyl)-carboxamide, melting at about 105–106° C.

4 - phenyl-4-carboxypiperidine 2,6-dimethylmorpholide oxalate, melting at about 90–152° C. with decomposition.

4 - (4 - ethylphenyl) - 4 - carboxypiperidine pyrrolidide, melting at about 109.5–110.5° C.

4 - (3-methoxyphenyl)-3 - 4 - carboxypiperidine pyrrolidide, melting at about 121.5–123.8° C.

4 - (4 - fluorophenyl)-4-carboxypiperidine morpholide, melting at about 133–136° C.

4 - (3 - methoxyphenyl)piperidine-4-(N,N - dimethyl)-carboxamide hydrochloride, melting at about 205–206° C.

4 - (4 - fluorophenyl)piperidine-4-(N,N-dimethyl)-carboxamide hydrochloride, melting at about 199.5–203° C.

4 - phenyl - 4 - carboxypiperidine 4 - phenylpiperazide, melting at about 126–129° C.

4 - (2 - thienyl)-4-carboxypiperidine pyrrolidide hydrochloride, melting at about 162–211° C.

4 - phenylpiperidine-4-(N - isopropyl)carboxamide oxalate, melting at about 211.5–212.5° C.

4 - (4-fluorophenyl) - 4 - carboxypiperidine pyrrolidide, melting at about 139.6–140.4° C.

4 - (4-chlorophenyl)piperidine-4-(N,N - dimethyl)-carboxamide hydrochloride, melting at about 227–228° C.

4 - (4 - chlorophenyl)-4-carboxypiperidine pyrrolidide, melting at about 146.8–147.6° C.

A second procedure is preferred when Y is benzyl. A mixture of 20 parts of an amide of the formula

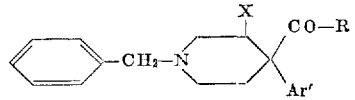

and 150 parts of 2-propanol and 50 parts of water is hydrogenated at about 30° C. in the presence of a palladium-on-charcoal catalyst. After absorption of the calculated amount of hydrogen the mixture is heated and then filtered. The filtrate is evaporated and the solid residue is purified to yield a compound of the formula

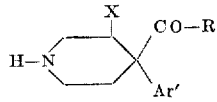

The following compounds were obtained by this procedure:

4 - phenylpiperidine - 4 - carboxamide, melting at about 154–155° C.

4 - phenylpiperidine - 4 - (N,N - dimethyl)carboxamide, melting at about 74.5–81° C.

4 - (4-tolyl)piperidine-4-(N,N - dimethyl)carboxamide, melting at about 126–130° C.

4 - (3-tolyl)piperidine-4-(N,N - dimethyl)carboxamide, melting at about 99.2–101.1° C.

4 - phenylpiperidine - 4 - (N,N-diethyl)carboxamide hydrochloride, melting at about 235.8–236.5° C.

4-phenylpiperidine-4-(N-tert. butyl)carboxamide hydrochloride, melting at about 276.8–278° C.

4 - phenylpiperidine-4-N-carboxyanilide hydrochloride, melting at about 218.5–222° C.

4 - phenylpiperidine-4-(N-benzyl)carboxamide hydrochloride, melting at about 278–279.5° C.

4-phenylpiperidine-4-N-methyl-N-carboxyanilide hydrochloride, melting at about 275–276° C.

4-(4-tolyl)-4-carboxypiperidine pyrrolidide, melting at about 142.2–142.8° C.

4-(3-tolyl)-4-carboxypiperidine pyrrolidide, melting at about 109–110° C.

4-phenyl-4-carboxypiperidine pyrrolidide, melting at about 126–127.4° C.

4-phenyl-4-carboxypiperidine pyrrolidide hydrochloride, melting at about 229–230.5° C.

4-phenyl-4-carboxypiperidine morpholide, melting at about 125–126° C.

4-(4-tolyl)-4-carboxypiperidine morpholide, melting at about 142–142.8° C.

4-(3-tolyl)-4-carboxypiperidine morpholide, melting at about 110.4–111.2° C.

4-phenyl-4-carboxypiperidine piperidide, melting at about 122–123.5° C.

4-(4-tolyl)-4-carboxypiperidine piperidide, melting at about 104.8–107° C.

The compounds which constitute this invention and the methods for their preparation will appear more fully from a consideration of the following examples, which are given for the purpose of illustration only and are not to be construed as limiting the invention in spirit of scope. In these examples quantities are indicated in parts by weight. Temperatures are expressed in degrees centigrade (° C.), and pressures are expressed in millimeters of mercury (mm.).

*Example 1*

A solution of 71 parts of γ-chlorobutyryl chloride and 63 parts of benzene are added with stirring and cooling to a suspension of 71 parts of aluminum chloride in 310 parts of benzene. After the addition is completed, the cooling bath is removed, and the stirring is continued for 30 minutes. The reaction mixture is poured into ice water. The benzene layer is separated, dried over anhydrous sodium sulfate, and filtered. The filtrate is concentrated under reduced pressure to remove the benzene and the residue is distilled to yield γ-chlorobutyrophenone boiling at about 134–137° C. at 5 mm. pressure.

By equimolar substitution of the appropriate starting materials, the following compounds are obtained.

ω-Chlorohexanophenone
γ,3-dichlorobutyrophenone
γ-Chloro-4-methoxybutyrophenone; B.₆=175° C.
γ-Chloro-4-iodobutyrophenone
γ-Chloro-3-methoxybutyrophenone
γ-Chloro-4-fluorobutyrophenone; B.₆=136–142° C.

*Example 2*

A mixture of 5.4 parts of γ-chlorobutyrophenone, 6 parts of 3α-methyl-4-phenylpiperidine-4-carboxamide, 8.5 parts of sodium carbonate, 0.1 part of potassium iodide, and 200 parts of 4-methyl-2-pentanone is refluxed for 72 hours, cooled, and filtered. The filtrate is evaporated and the residue dissolved in anhydrous ether. After filtration to remove inorganic salts, hydrogen chloride gas is passed through the solution. The solid precipitate is collected on a filter, recrystallized from 2-propanol, and dried to yield 1 - (γ-benzoylpropyl)-3α-methyl-4-phenylpiperidine-4-carboxamide hydrochloride melting at about 196.2–198.6° C.

Example 3

By substituting 3β-methyl-4-phenylpiperidine-4-carboxamide in the procedure of Example 2, 1-(γ-benzoylpropyl)-3β-methyl-4-phenylpiperidine-4-carboxamide hydrochloride melting at about 267.5–268° C. is obtained. The compound has the formula

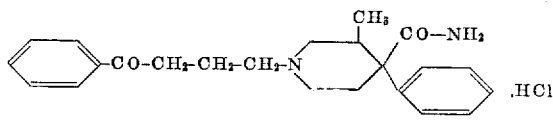

Example 4

A mixture of 4 parts of γ-chlorobutyrophenone, 4.5 parts of 4-methylpiperidine - 4 - (N-methyl)carboxamide, 6.4 parts of sodium carbonate, 0.1 part of potassium iodide and 120 parts of 4-methyl-2-pentanone is refluxed for 72 hours, cooled, and partitioned between water and ether. After separation, the organic layer is dried over potassium carbonate and then saturated with dry hydrogen chloride gas. The solid precipitate is collected on a filter and recrystallized from acetone to yield 1-(γ-benzoylpropyl) - 4 - phenylpiperidine-4-(N-methyl)carboxamide hydrochloride melting at about 209.5–212° C.

Example 5

By substituting 4-phenylpiperidine-4-(N,N-dimethyl)-carboxamide for 4-phenylpiperidine-4-(N-methyl)carboxamide in the procedure of Example 4, 1-(γ-benzoylpropyl) - 4 - phenylpiperidine-4-(N,N-dimethyl)carboxamide hydrochloride melting at about 214.5–215.5° C. is obtained. The compound has the formula

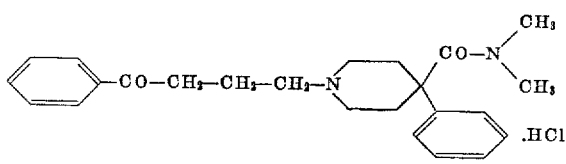

Example 6

To a stirred mixture of 3 parts of 3β-methyl-4-phenylpiperidine-4-(N,N-dimethyl)carboxamide, 4.65 parts of sodium carbonate, 0.1 part of potassium iodide, in 44 parts 4-methyl-2-pentanone is added portionwise a solution of 3 parts of γ-chlorobutyrophenone in 16 parts of 4-methyl-2-pentanone. The mixture is stirred and refluxed for 24 hours and then extracted with diisopropyl ether. Hydrogen chloride gas is passed through the ethereal solution and the solid precipitate is collected on a filter and recrystallized from 2-propanol to yield 1-(γ-benzoylpropyl) - 3β - methyl-4-phenylpiperidine-4-(N,N-dimethyl)carboxamide hydrochloride melting at about 238–239° C.

Example 7

To a mixture of 5 parts of 4-(3-tolyl)piperidine-4-(N,N-dimethyl)carboxamide, 6.4 parts of sodium carbonate, 0.1 part of potassium iodide, in 60 parts of 5-methyl-2-hexanone is added portionwise a solution of 5.1 parts of γ-chlorobutyrophenone in 60 parts of 4-methyl-2-pentanone. This mixture is then refluxed for 42 hours, cooled and partitioned between water and ether. After separation of the layers, the ethereal solution is dried and then saturated with hydrogen chloride gas. After evaporation the oily residue is triturated in acetone. Upon scratching, a solid precipitate is obtained which is collected on a filter and dried to yield 1-(γ-benzoylpropyl)-4 - (3 - tolyl)piperidine - 4 - (N,N - dimethyl)carboxamide hydrochloride melting at about 200–201.4° C.

Example 8

To a stirred solution of 6.4 parts of γ-chlorobutyrophenone, 7.8 parts of sodium carbonate, 0.1 part of potassium iodide, in 60 parts of 4-methyl-2-pentanone are added portionwise 6.2 parts of 4-(4-tolyl)-piperidine-4-(N,N-dimethyl)carboxamide in 60 parts of 4-methyl-2-pentanone. The mixture is then refluxed for 36 hours, cooled, and partitioned between water and ether. After separation, the organic solution is dried over sodium carbonate and then saturated with hydrogen chloride gas. The liquid is decanted from the precipitate which is saved. After evaporation of the liquid the residue is combined with the precipitate saved from above. The mixture is then recrystallized from a 4:1 mixture of acetone and 2-propanol by chilling at −20° C. After drying, the pale yellow amorphous powder of 1-(γ-benzoylpropyl)-4-(4-tolyl)piperidine - 4 - (N,N - dimethyl)carboxamide hydrochloride melts at about 227–228.5° C. The compound has the formula

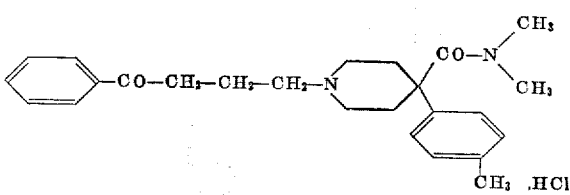

Example 9

To a stirred solution of 6.7 parts of 4-(4-chlorophenyl)piperidine-4-(N,N-dimethyl)carboxamide, 7.8 parts of sodium carbonate, 0.1 part of potassium iodide, in 60 parts 4-methyl-2-pentanone is added portionwise a solution of 6.4 parts of γ-chlorobutyrophenone in 60 parts of 4-methyl-2-pentanone. The mixture is then refluxed for 42 hours, cooled and partitioned between water and ether. After separation the ethereal solution is dried and saturated with hydrogen chloride gas. The solid precipitate is collected on a filter and recrystallized from a 10:1 mixture of acetone and 2-propanol by chilling at −15° C. to yield 1-(γ-benzoylpropyl)-4-(4-chlorophenyl)piperidine - 4 - (N,N - dimethyl)carboxamide hydrochloride melting at about 232–233° C.

By substituting 7.5 parts of ω-chlorohexanophenone in the procedure of the above paragraph, 1-(ω-benzoylpentyl) - 4 - (4 - chlorophenyl)piperidine - 4 - (N,N - dimethyl)carboxamide hydrochloride of the formula

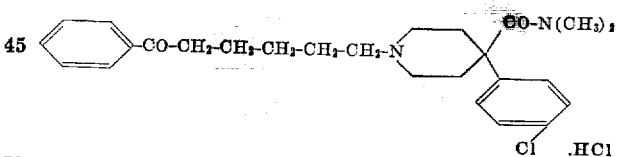

is obtained.

Example 10

The base of 4-phenylpiperidine-4-(N,N-diethyl)carboxamide hydrochloride is liberated by dissolving 7.49 parts of the salt in water, rendering the solution alkaline, extracting the solution with ether, and drying and evaporating the ether extract to yield the base as a residue. This residue, 7.8 parts of sodium carbonate, 0.1 part of potassium iodide, in 120 parts of 4-methyl-2-pentanone are added portionwise to 6.4 parts of γ-chlorobutyrophenone. After the addition is completed, the mixture is refluxed for 20 hours, cooled, and washed with water, and diluted to a volume of 1000 parts. After drying, the ethereal solution is saturated with dry hydrogen chloride gas. The mixture is then evaporated and the residue is dissolved in acetone. After chilling at 0° C. a solid precipitates which is collected on a filter and dried to yield 1 - (γ - benzoylpropyl) - 4 -phenylpiperidine - 4 - (N,N-diethyl)carboxamide hydrochloride. The base of this crude hydrochloride is then released and recrystallized from diisopropyl ether. The pale yellow powder of the base melts at about 69.5–71.5° C.

Example 11

A mixture of 3.7 parts of γ-chlorobutyrophenone, 4.5 parts of 3α - methyl - 4 - phenylpiperidine - 4 - (N,N-diethyl)carboxamide, 5.5 parts of sodium carbonate, 0.1 part of potassium iodide, in 120 parts of 4-methyl-2-pentanone is refluxed for 72 hours and then filtered. The filtrate is evaporated and the residue dissolved in 2-propanol. To this solution is added an excess of oxalic acid in 2-propanol. The solution is filtered to remove impurities. Diisopropyl ether is added to the filtrate and the solid which precipitates is collected on a filter and dried to yield 1 - (γ - benzoylpropyl) - 3α - methyl - 4 - phenylpiperidine-4-(N,N-diethyl)carboxamide oxalate melting at about 163–167.8° C.

*Example 12*

A mixture of 4 parts of γ-chlorobutyrophenone, 5 parts of 3β-methyl-4-phenylpiperidine-4-(N,N-diethyl)-carboxamide, 5.3 parts of sodium carbonate, 0.1 part of potassium iodide, in 120 parts of 4-methyl-2-pentanone is refluxed for 20 hours and filtered. The filtrate is boiled with activated charcoal and evaporated. The residue is dissolved in diisopropyl ether. Hydrogen chloride gas is passed through the solution and the solid which precipitates is recrystallized from butanone and then dried to yield 1-(γ-benzoylpropyl)-3β-methyl-4-phenylpiperidine-4-(N,N-diethyl)carboxamide hydrochloride melting at about 186.8–188.6° C.

*Example 13*

A mixture of 2.5 parts of γ-chlorobutyrophenone, 6.2 parts of 4-phenyl-4-carboxypiperidine pyrrolidide, 0.1 part of potassium iodide, in 100 parts of toluene is heated in a sealed tube for 72 hours at 120° C. and then filtered. The filtrate is washed with water, dried over sodium carbonate, and saturated with hydrogen chloride gas. The solution is decanted from the oil, which is saved. The solution is then evaporated and the oil and the residue are combined and dissolved in acetone. The solid which precipitates is collected on a filter and then triturated with acetone to yield 1-(γ-benzoylpropyl)-4-phenyl - 4 - carboxypiperidine pyrrolidide hydrochloride melting at about 203–204° C. By further cooling the acetone solution at −20° C., a second precipitate is obtained which melts at about 207–209° C. The compound thus formed has the formula

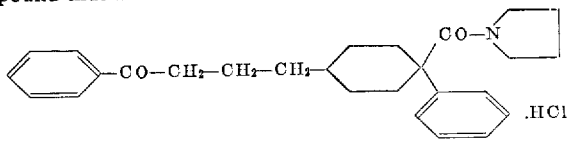

*Example 14*

A mixture of 4.6 parts of γ-chlorobutyrophenone, 5.6 parts of 3α-methyl-4-phenyl-4-carboxypiperidine pyrrolidide, 0.1 part of potassium iodide, and 120 parts of 4-methyl-2-pentanone is refluxed for 72 hours and then filtered. The filtrate is boiled with activated charcoal and then evaporated. The residue is dissolved in 2-propanol and then an excess of oxalic acid in 2-propanol is added to the solution. The solid which precipitates is collected on a filter and dried to yield 1-(γ-benzoylpropyl)-3α-methyl-4-phenyl-4-carboxypiperidine pyrrolidide oxalate melting at about 171.6–174.6° C. with decomposition.

*Example 15*

A mixture of 3.1 parts of γ-chlorobutyrophenone, 3.4 parts of 4-(3-tolyl)-4-carboxypiperidine pyrrolidide, 2.8 parts of sodium carbonate, 0.1 part of potassium iodide and 160 parts of 4-methyl-2-pentanone is refluxed for 40 hours, cooled, washed with water, diluted with ether, dried and then evaporated to yield an oily residue which is dissolved in ethanol. To this solution is added oxalic acid in ethanol. The solid which precipitates is collected on a filter and dried to yield 1-(γ-benzoylpropyl)-4-(3-tolyl)-4-carboxypiperidine pyrrolidide oxalate melting at about 200–203.8° C. with decomposition.

*Example 16*

To a stirred solution of 6.8 parts of 4-(4-tolyl)-4-carboxypiperidine pyrrolidide, 7.8 parts of sodium carbonate, 0.1 part of potassium iodide, in 120 parts of 4-methyl-2-pentanone are added portionwise 6.5 parts of γ-chlorobutyrophenone. The mixture is refluxed for 22 hours and then partitioned between water and ether. After separation, the organic layer is dried and saturated with hydrogen chloride gas. The sticky precipitate solidifies upon scratching and is collected on a filter and saved. The filtrate is evaporated and the combined residue and precipitate are washed in water to yield 1-(γ-benzoylpropyl)-4-(4-tolyl)-4-carboxypiperidine pyrrolidide hydrochloride melting at about 200–201.5° C.

*Example 17*

To a stirred solution of 5.5 parts of 4-(4-fluorophenyl)-4-carboxypiperidine pyrrolidide, 6.4 parts of sodium carbonate, 0.1 part of potassium iodide, and 80 parts of 4-methyl-2-pentanone is added portionwise a solution of 5.1 parts of γ-chlorobutyrophenone in 40 parts of 4-methyl-2-pentanone. This mixture is then refluxed for 42 hours, cooled, washed with water, dried and evaporated. The oily residue is dissolved in methanol. To this solution is added oxalic acid and methanol and the solid which precipitates is collected on a filter and dried to yield 1-(γ-benzoylpropyl)-4-(4-fluorophenyl)-4-carboxypiperidine pyrrolidide oxalate melting at about 206–208° C. The base has the formula

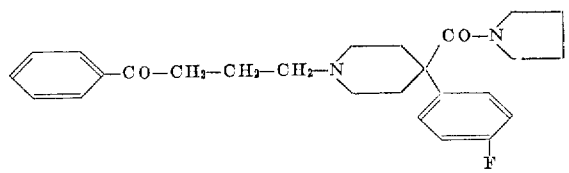

*Example 18*

To a stirred solution of 7.3 parts of 4-(4-chlorophenyl)-4-carboxypiperidine pyrrolidide, 7.8 parts of sodium carbonate, 0.1 part of potassium iodide, in 60 parts of 4-methyl-2-pentanone is added portionwise a solution of 6.4 parts of γ-chlorobutyrophenone in 60 parts of 4-methyl-2-pentanone. The mixture is refluxed for 40 hours and then partioned between water and ether. After separation, the ether layer is dried and then saturated with hydrogen chloride gas. The oil which forms is separated and dissolved in acetone with gentle heating. After chilling at −20° C., the solid precipitate is collected on a filter and then triturated with a boiling 2:1 mixture of acetone and diisopropyl ether to yield 1-(γ-benzoylpropyl)-4-(4-chlorophenyl)-4-carboxypiperidine pyrrolidide hydrochloride melting at about 216–218° C.

By substituting 8 parts of 4-(4-trifluoromethylphenyl)-4-carboxypiperidine pyrrolidide in the above procedure, 1 - (γ - benzoylpropyl) - 4 - (4-trifluoromethylphenyl)-4-carboxypiperidine pyrrolidide hydrochloride is obtained. The compound has the formula

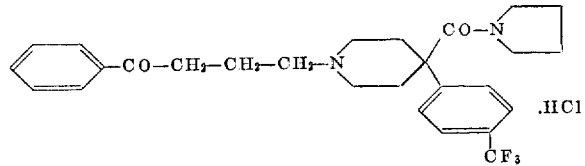

*Example 19*

To a stirred solution of 6.8 parts of 4-phenyl-4-carboxypiperidine piperidide, 7.8 parts of sodium carbonate, 0.1 part of potassium iodide, in 120 parts of 4-methyl-2-pentanone are added portionwise 6.4 parts of γ-chlorobutyrophenone. The mixture is then refluxed for 36 hours, cooled, and filtered. The solid material is washed with water and dried to yield 1-(γ-benzoylpropyl)-4-phenyl-4-carboxypiperidine piperidide melting at about 132.6–133.5° C.

Example 20

To a stirred solution of 3α-methyl-4-phenyl-4-carboxypiperidine piperidide which has been liberated from 3.5 parts of the hydrochloride of this base, in 64 parts of 4-methyl-2-pentanone are added 0.1 part of potassium iodide, 3.8 parts of sodium carbonate, 3.3 parts of γ-chlorobutyrophenone in 16 parts of 4-methyl-2-pentanone. The mixture is stirred and refluxed for 66 hours, cooled, and filtered. The filtrate is evaporated and the residue dissolved in 2-propanol. To this solution is added an excess of oxalic acid in 2-propanol. The mixture is then boiled for 5 minutes and cooled. The solid precipitate is collected on a filter and dried to yield 1-(γ-benzoylpropyl)-3α-methyl-4-phenyl-4-carboxypiperidine piperidide oxalate melting at about 180.1–182° C.

Example 21

A mixture of 3.1 parts of γ-chlorobutyrophenone, 4.3 parts of 4-phenyl-4-carboxypiperidine morpholide, 5 parts of sodium carbonate, 0.1 part of potassium iodide, in 125 parts of 4-methyl-2-pentanone is refluxed for 72 hours and then diluted with water to dissolve the precipitate which forms. The organic layer is separated and diluted with 500 parts of ether. After drying, hydrogen chloride gas is passed through the solution. The solid which precipitates is collected on a filter and triturated with a boiling 2:2:1 mixture of acetone, 2-propanol, and ethanol. After drying, the pale yellow powder of 1-(γ-benzoylpropyl)-4-phenyl-4-carboxypiperidine morpholide hydrochloride melts at about 285° C. with decomposition. The compound has the formula

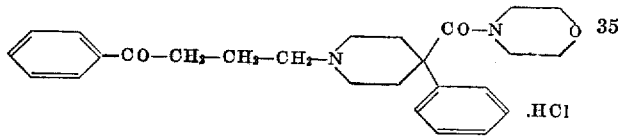

Example 22

To a stirred solution of the liberated base of 4.5 parts of 3α-methyl-4-phenyl-4-carboxypiperidine morpholide hydrochloride, 4.9 parts of sodium carbonate, and 0.1 part of potassium iodide in 64 parts of 4-methyl-2-pentanone are added 4 parts of γ-chlorobutyrophenone in 16 parts of 4-methyl-2-pentanone. This mixture is stirred and refluxed for 68 hours, cooled, and filtered. The filtrate is evaporated and the residue is dissolved in 2-propanol. An excess of oxalic acid in 2-propanol is added to this solution and the mixture is boiled for 5 minutes and then cooled to room temperature to yield 1-(γ-benzoylpropyl)-3α-methyl-4-phenyl-4-carboxypiperidine morpholide oxalate melting at about 181.5–184.5° C. as a precipitate.

Example 23

A mixture of 4.4 parts of γ-chlorobutyrophenone, 5 parts of 3β-methyl-4-phenyl-4-carboxypiperidine morpholide, 5.5 parts of sodium carbonate, 0.1 part of potassium iodide, and 120 parts of 4-methyl-2-pentanone is stirred and refluxed for 20 hours and then cooled. The mixture is filtered and the filtrate boiled with activated charcoal and then evaporated. The residue is dissolved in diisopropyl ether. Hydrogen chloride gas is passed through the solution. The solid which precipitates is collected on a filter and then recrystallized from butanone to yield 1-(γ-benzoylpropyl)-3β-methyl-4-carboxypiperidine morpholide hydrochloride melting at about 220.5–221.5° C.

Example 24

To a stirred solution of 5.2 parts of 4-(3-tolyl)-4-carboxypiperidine morpholide, 6.6 parts of sodium carbonate, 0.1 part of potassium iodide, in 60 parts of 4-methyl-2-pentanone is added portionwise a solution of 5 parts of γ-chlorobutyrophenone in 50 parts of 4-methyl-2-pentanone. After refluxing for 42 hours, the mixture is washed with water and then diluted with ether to a volume of about 1000 parts. After drying over potassium carbonate, hydrogen chloride gas is passed through the solution. The oil which separates solidifies upon treatment with water. The yellow powder of 1-(γ-benzoylpropyl)-4-(3-tolyl)-4-carboxypiperidine morpholide hydrochloride melts at about 244–248° C.

Example 25

To a stirred mixture of 7.2 parts of 4-(4-tolyl)-4-carboxypiperidine morpholide, 7.8 parts of sodium carbonate, 0.1 part of potassium iodide, in 60 parts of 4-methyl-2-pentanone is added portionwise a solution of 6.4 parts of γ-chlorobutyrophenone in 60 parts of 4-methyl-2-pentanone. After refluxing for 22 hours, this mixture is cooled and partitioned between water and ether. After separation, the organic layer is dried and saturated with hydrogen chloride gas. The solid which precipitates is collected on a filter and then boiled in acetone. The insoluble material is collected on a filter and dried to yield 1-(γ-benzoylpropyl)-4-(4-tolyl)-4-carboxypiperidine morpholide hydrochloride melting at about 224–225° C.

By substituting 7.7 parts of 4-(4-ethylphenyl)-4-carboxypiperidine morpholide in the procedure of the above paragraph, 1-(γ-benzoylpropyl)-4-(4-ethylphenyl)-4-carboxypiperidine morpholide hydrochloride is obtained. The compound has the formula

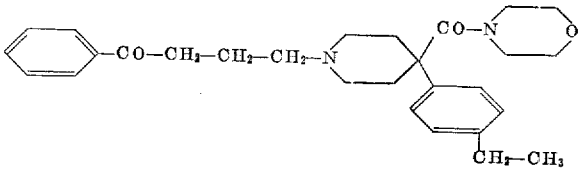

Example 26

To a stirred solution of 6.7 parts of 4-(4-chlorophenyl)-piperidine-4-(N,N-dimethyl)carboxamide, 7.8 parts of sodium carbonate, 0.1 part of patassium iodide, and 60 parts of 4-methyl-2-pentanone is added portionwise a solution of 7.4 parts of γ-chloro-4-methoxybutyrophenone in 60 parts of 4-methyl-2-pentanone. The mixture is then refluxed for 42 hours, cooled, and partitioned between water and ether. After separation, the ethereal layer is dried over potassium carbonate and saturated with hydrogen chloride gas. The sticky precipitate is then separated and recrystallized from acetone by chilling at −20° C. The white microcrystalline powder of 1-[γ-(4-methoxybenzoyl)propyl]-4-(4-chlorophenyl)piperidine-4-(N,N-dimethyl)carboxamide hydrochloride melting at about 194–195.2° C.

By substituting γ-chloro-3-methoxybutyrophenone in the procedure of the above paragraph, 1-[γ-(3-methoxybenzoyl)propyl]-4-(4-chlorophenyl)piperidine-4-(N,N-dimethyl)carboxamide hydrochloride is obtained. The compound has the formula

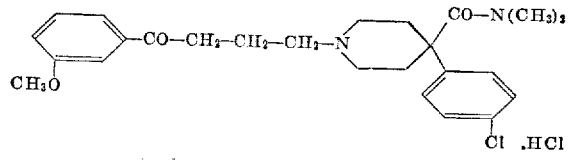

Example 27

A mixture of 84 parts of thiophene, 141 parts of γ-chlorobutyryl chloride, and 870 parts of benzene is cooled to about 0° C. While this temperature is maintained, 260 parts of stannic chloride are added over a 2 hour period. After the addition is completed, the cooling bath is removed and the stirring is continued for about an hour. The reaction mixture is then poured into a mixture of 60 parts of concentrated hydrochloric acid and 450 parts of ice water. The organic layer is separated, washed with

15 water, dried over anhydrous calcium chloride, and filtered. The filtrate is concentrated under reduced pressure. The residue is distilled to yield 2-(γ-chlorobutyryl)thiophene which boils at 144–146° C. at 11 mm. of pressure.

Example 28

From 4.9 parts of 4-phenylpiperidine-4-(N-tert. butyl)-carboxamide hydrochloride, the free base is liberated by dissolving 4.9 parts of the salt in water, rendering the solution alkaline, extracting the solution with chloroform, and evaporating the organic extract. The residue, 5.3 parts of sodium carbonate, and 0.1 part of potassium iodide, and 60 parts of 4-methyl-2-pentanone are stirred together. To this solution are added portion-wise 4.3 parts of 2-(γ-chlorobutyryl)thiophene in 60 parts of 4-methyl-2-pentanone. After refluxing for 48 hours the mixture is cooled and washed with water. The organic solution is dried and evaporated. The residue is dissolved in methanol. A methanolic solution of oxalic acid is then added to this solution. The solid which precipitates is collected on a filter and dried to yield 1-[γ-(2-thenoyl)-propyl]-4-phenylpiperidine - 4 - (tert. butyl)carboxamide oxalate melting at about 219–220.5° C. The base has the formula

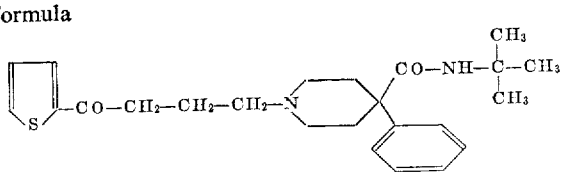

Example 29

By substituting equimolar quantities of 4-phenyl-piperidine-4-(N-phenyl)carboxamide in the procedure of Example 28, 1-[γ-(2-thenoyl)propyl]-4-phenylpiperidine-4-N-phenylcarboxamide oxalate melting at about 217–220.8° C. with decomposition is obtained.

Example 30

The free base of 4-phenylpiperidine-4-(N-benzyl)-carboxamide hydrochloride is liberated by dissolving 6.6 parts of the salt in water, rendering the solution alkaline, extracting the solution with ether, evaporating the ether extract. To the residue, 6.4 parts of sodium carbonate, 0.1 part of potassium iodide, and 60 parts of 4-methyl-2-pentanone is added portionwise with stirring a solution of 5.3 parts of 2-(γ-chlorobutyryl)thiophene and 60 parts of 4-methyl-2-pentanone. This mixture is then refluxed for 40 hours, cooled, partitioned between water and ether. The ethereal solution is separated and dried and then saturated with hydrogen chloride gas. The sticky hydrochloride which precipitates is recrystallized from acetone by chilling at −20° C. to yield 1-[γ-(2-thenoyl)propyl]-4-phenylpiperidine - 4 - (N-benzyl)carboxamide hydrochloride melting at about 182.4–184.2° C.

By substituting 6 parts of 2-(ω-caproyl)thiophene in the procedure of the above paragraph, 1-[ω-(2-thenoyl)-pentyl]-4-phenylpiperidine - 4 - (N-benzyl)carboxamide hydrochloride of the formula

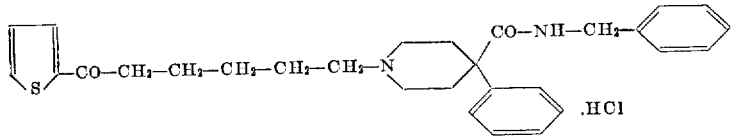

is obtained.

Example 31

By substituting 4-phenylpiperidine - 4 - N-methyl-N-phenylcarboxamide in the procedure of the first paragraph of Example 30, 1-[γ-(2-thenoyl)propyl]-4-phenylpiperidine - 4 - (N-methyl)-4-(N-phenyl)carboxamide hydro-

16 chloride melts at about 231.6–232.5° C. The compound has the formula

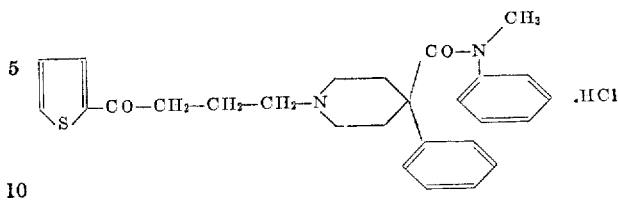

Example 32

To a stirred mixture of 4 parts of 3β-methyl-4-phenyl-piperidine - 4 - (N,N-dimethyl)carboxamide, 5.1 parts of sodium carbonate, 0.1 part of potassium iodide in 44 parts of 4-methyl-2-pentanone is added portionwise a solution of 4.4 parts of 2-(γ-chlorobutyryl)thiophene in 16 parts of 4-methyl-2-pentanone. The mixture is then refluxed and stirred for 25 hours and filtered. The filtrate is evaporated and the residue is dissolved in a 3:2 mixture of 2-propanol and diisopropyl ether. Hydrogen chloride gas is passed through the solution and the solid which precipitates is collected on a filter and dried to yield 1-[γ-(2-thenoyl)propyl] - 3β - methyl - 4 - phenylpiperidine - 4 - (N,N-dimethyl)carboxamide hydrochloride melting at about 244–245.2° C.

Example 33

To a stirred mixture of 5 parts of 4-(3-tolyl)-piperidine-4-(N,N-dimethyl)carboxamide, 6.4 parts of sodium carbonate, 0.1 part of potassium iodide in 60 parts of 4-methyl-2-pentanone is added a solution of 3.5 parts of 2-(γ-chlorobutyryl)thiophene in 60 parts of 4-methyl-2-pentanone. The mixture is then refluxed for 42 hours, cooled, partitioned between water and ether. The ethereal layer is separated, dried over potassium carbonate, saturated with hydrogen chloride gas and then evaporated. The residue is crystallized in acetone by scratching. This solid is then taken up in acetone and the solution is heated to boiling. After cooling to 0° C., the precipitate is collected on a filter and dried to yield 1[γ-(2-thenoyl)-propyl] - 4 - (3-tolyl)-piperidine - 4 - (N,N-dimethyl)-carboxamide hydrochloride melting at about 206.5–207.7° C.

Example 34

To a stirred mixture of 6.2 parts of 4-(4-tolyl)piperidine - 4 - (N,N-dimethyl)carboxamide, 7.8 parts of sodium carbonate, 0.1 part of potassium iodide, and 60 parts of 4-methyl - 2 - pentanone is added portionwise a solution of 6.6 parts of 2-(γ-chlorobutyryl)thiophene in 60 parts of 4-methyl - 2 - pentanone. The mixture is then refluxed for 36 hours, cooled one day at room temperature, partitioned between water and ether. The ethereal layer is separated, dried over potassium carbonate, and saturated with hydrogen chloride gas. The sticky solid which precipitates is separated from the liquid and saved. This liquid is then evaporated. The residue and the sticky precipitate saved from above are combined and boiled in a 2:1 mixture of acetone and 2-propanol. The undissolved material is collected and dried to yield 1-[γ-(2-thenoyl)propyl] - 4 - (4-tolyl)piperidine - 4 - (N,N-dimethyl)carboxamide hydrochloride melting at about 242.5–243.5° C. By chilling the acetone - 2 - propanol solution at −15° C. a second crop of the product is obtained which melts at about 242–244.5° C.

Example 35

To a stirred solution of 6.7 parts of 4-(4-chlorophenyl)-piperidine - 4 - (N,N-dimethyl)carboxamide, 7.8 parts of sodium carbonate, 0.1 part of potassium iodide, and 120 parts of 4-methyl - 2 - pentanone is added portionwise 6.6 parts of 2-(γ-chlorobutyryl)thiophene. The mixture is then refluxed for 42 hours, cooled, and partitioned between water and ether. The ethereal solution is separated, dried over potassium carbonate, and saturated with hydrogen chloride gas. The sticky solid which precipitates solidifies by scratching and is collected on a filter and then triturated with acetone to yield 1-[γ-(2-thenoyl)propyl] - 4 - (4-chlorophenyl)-piperidine-4-(N,N-dimethyl)carboxamide hydrochloride melting at about 245–246.4° C.

Example 36

To a stirred mixture of 5.2 parts of 4-(4-methoxyphenyl)piperidine - 4 - (N,N-dimethyl)carboxamide, 6.4 parts of sodium carbonate, 0.1 part of potassium iodide, and 80 parts of 4-methyl-2-pentanone is added portionwise a solution of 5.3 parts of 2-(γ-chlorobutyryl)thiophene in 40 parts of 4-methyl-2-pentanone. This mixture is then refluxed for 40 hours, cooled, and partitioned between water and ether. After separation, the organic solution is dried over potassium carbonate and saturated with hydrogen chloride gas. The solid precitatate is collected on a filter, triturated with acetone, and recrystallized from 2-propanol to yield 1-[γ-(2-thenoyl)-propyl]-4-(4-methoxyphenyl)piperidine - 4 - (N,N-dimethyl)-carboxamide hydrochloride melting at about 232–236.° C.

Example 37

A mixture of 3.9 parts of 2-(γ-chlorobutyryl)-thiophene, 4.5 parts of 3α-methyl - 4 - phenylpiperidine-4-(N,N-diethyl)carboxamide, 5.5 parts of sodium carbonate, 0.1 part of potassium iodide in 120 parts of 4-methyl - 2 - pentanone is refluxed for 72 hours and filtered. The filtrate is boiled with activated charcoal and then evaporated. The residue is dissolved in 2-propanol. To this solution is added oxalic acid in 2-propanol. The solid precipitate is collected on a filter and recrystallized for 2-propanol to yield 1-[γ-(2-thenoyl)propyl]-3α-methyl - 4 - phenylpiperidine - 4 - (N,N-diethyl)-carboxamide oxalate melting at about 149–153.2° C.

Example 38

A mixture of 4.2 parts of 2-(γ-chlorobutyryl)-thiophene, 5 parts of 3β-methyl-4-phenylpiperidine-4-(N,N-diethyl)carboxamide, 5.3 parts of sodium carbonate, 0.1 part of potassium iodide in 120 parts of 4-methyl-2-pentanone is refluxed for 40 hours and filtered. The filtrate is decolorized with activated charcoal and then evaporated. The residue is dissolved in diisopropyl ether. Hydrogen chloride gas is passed through the solution which is then decanted from the semi-solid precipitate. This precipitate is heated with butanone and then cooled to yield a solid precipitate which is collected on a filter and recrystallized from butanone. After drying, 1-[γ-(2-thenoyl)propyl] - 3β - methyl - 4 - phenylpiperidine - 4 - (N,N-diethyl)carboxamide hydrochloride melts at about 193.2–194.5° C.

Example 39

To a stirred solution of 6.25 parts of 4-(4-tolyl)-4-carboxypiperidine piperidide, 6.7 parts of sodium carbonate, 0.1 part of potassium iodide in 60 parts of 4-methyl-2-pentanone is added a solution of 5.7 parts of 2-(γ-chlorobutyryl)thiophene in 60 parts of 4-methyl-2-pentanone. The mixture is then refluxed for 42 hours and partitioned between water and ether. The ethereal solution is separated, dried over potassium carbonate, and saturated with hydrogen chloride gas. The sticky precipitate is collected on a filter and boiled in a 4:1 mixture of acetone and 2-propanol. The undissolved material is collected on a filter and dried to yield 1-[γ-(2-thenoyl)propyl]-4-(4-tolyl)-4-carboxypiperidine piperidide hydrochloride melting at about 243.5–245° C. By cooling the liquid at −20° C., a second crop precipitates which melts at 245.5–246.5° C.

Example 40

To a stirred solution of the free base of 3.5 parts of 3α-methyl-4-phenyl-4-carboxypiperidine piperidide hydrochloride, 64 parts of 4-methyl-2-pentanone, 3.8 parts of sodium carbonate, 0.1 part of potassium iodide is added a solution of 3.3 parts of 2-(γ-chlorobutyryl)thiophene in 16 parts of 4-methyl-2-pentanone. The mixture is stirred and refluxed for 66 hours and then filtered. The filtrate is boiled with activated charcoal and evaporated and the residue is dissolved in 2-propanol. To this solution is added a solution of oxalic acid in 2-propanol. The solid which precipitates is collected on a filter and then recrystallized from 2-propanol to yield 1-[γ-(2-thenoyl)propyl]-3α-methyl-4-phenyl-4-carboxypiperidine piperidide oxalate melting at about 184–187° C.

Example 41

A mixture of 3.8 parts of 2-(γ-chlorobutyryl)-thiophene, 4 parts of 3β-methyl-4-phenyl-4-carboxypiperidine piperidide, 4.5 parts of sodium carbonate, 0.1 part of potassium iodide, and 120 parts of 4-methyl-2-pentanone is stirred and refluxed for 20 hours and then filtered. The filtrate is evaporated and the residue dissolved in dry isopropyl ether. After decolorizing with activated charcoal, the solution is saturated with hydrogen chloride gas. The solid which precipitates is recrystallized from butanone to yield 1-[γ-(2-thenoyl)propyl]-3β-methyl-4-phenyl-4-carboxypiperidine piperidide hydrochloride melting at about 209–210° C.

By substituting 4.5 parts of 3β-methyl-4-phenyl-4-carboxypiperidine piperidide in the procedure of the above paragraph, 1[γ-(2-thenoyl)propyl]-3β-methyl-4-phenyl-4-carboxypiperidine piperidide hydrochloride is obtained. The compound has the formula

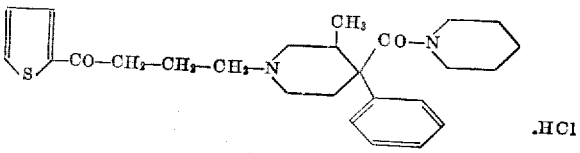

Example 42

To a stirred solution of 6.4 parts of 4-phenyl-4-carboxypiperidine pyrrolidide, 7.8 parts of sodium carbonate, 0.1 part of potassium iodide, and 120 parts of 4-methyl-2-pentanone are added portionwise 6.6 parts of 2-(γ-chlorobutyryl)thiophene. The mixture is then refluxed for 36 hours and the solid which precipitates is collected on a filter and washed with water. After drying 1-[γ-(2-thenoyl)propyl]-4-phenyl-4-carboxypiperidine pyrrolidide melts at about 125.4–127° C. The hydrochloride of this compound melts at about 229–235° C.

Example 43

To a stirred solution of 4 parts of 3β-methyl-4-phenyl-4-carboxypiperidine pyrrolidide, 4.65 parts of sodium carbonate, 0.1 part of potassium iodide in 44 parts of 4-methyl-2-pentanone is added portionwise a solution of 4 parts of 2-(γ-chlorobutyryl)thiophene in 8 parts of 4-methyl-2-pentanone. The mixture is then refluxed for 40 hours with stirring and filtered. The filtrate is evaporated and the residue dissolved in diisopropyl ether. The solid which precipitates is collected on a filter and then purified in boiling butanone to yield 1-[γ-(2-thenoyl)propyl]-3β-methyl-4-phenyl-4-carboxypiperidine pyrrolidide hydrochloride melting at about 231.5–232° C.

Example 44

To a stirred solution of 5.5 parts of 4-(3-tolyl)-4-carboxypiperidine pyrrolidide, 6.5 parts of sodium carbonate, 0.1 part of potassium iodide, and 60 parts of 4-methyl-2- pentanone is added portionwise a solution of 5.3 parts of 2-(γ-chlorobutyryl)thiophene in 60 parts of 4-methyl-2-pentanone. The mixture is then stirred and refluxed for 42 hours, cooled, washed with water, diluted to a volume of about 1,000 parts with ether, dried, filtered, and saturated with hydrogen chloride gas. The precipitate is collected on a filter and triturated with acetone to yield 1-[γ-(2-thenoyl)propyl]-4-(3-tolyl)-4-carboxypiperidine pyrrolidide hydrochloride melting at about 194.8–195.8° C. The oxalate of this compound is formed by treating a methanolic solution of the base with oxalic acid in methanol and melts at 205–206° C.

Example 45

To a stirred mixture of 6.8 parts of 4-(4-tolyl)-4-carboxypiperidine pyrrolidide, 7.8 parts of sodium carbonate, 0.1 part of potassium iodide, and 60 parts of 4-methyl-2-pentanone is added portionwise a solution of 6.6 parts of 2-(γ-butyryl)thiophene in 60 parts of 4-methyl-2-pentanone. This mixture is then refluxed for 22 hours, cooled, and partitioned between water and ether. The organic solution is separated, dried over potassium carbonate, and saturated with hydrogen chloride gas. The ether is evaporated and the oily residue is treated with acetone. The solid which precipitates is collected and then heated in acetone. The insoluble fraction is collected on a filter and dried to yield 1-[γ-(2-thenoyl)-propyl]-4-(4-tolyl)-4-carboxypiperidine pyrrolidide hydrochloride melting at about 231–232.5° C.

Example 46

The free base of 4-(4-fluorophenyl)piperidine-4-(N,N-dimethyl)carboxyamide hydrochloride is liberated by dissolving 6.1 parts of the salt in water, rendering the solution alkaline, extracting the solution with ether, and then evaporating the ether extract to yield the residue. This residue is dissolved in 80 parts of 4-methyl-2-pentanone and to this solution is added 6.4 parts of sodium carbonate, 0.1 part of potassium iodide, and then 5.2 parts of 2-(γ-butyryl)thiophene in 40 parts of 4-methyl-2-pentanone portionwise. The mixture is then refluxed for 40 hours, cooled, washed with water, dried, and then evaporated. To a methanolic solution of the oily residue is added oxalic acid in methanol. After chilling at 0° C., a precipitate is obtained which is collected and dried to yield 1-[γ-(2 - thenoyl)propyl]-4-(4-fluorophenyl)piperidine-4-(N,N-dimethyl)carboxamide oxalate melting at 218–219° C.

By substituting equivalent quantities of the starting materials, the following compounds are obtained:

1[γ-(2-thenoyl)propyl] - 4 - (3-methoxyphenyl)-piperidine-4-(N,N-dimethyl)carboxamide oxalate melting at about 182–184° C.

1 - [γ-(2-thenoyl)propyl]-4-(4-ethylphenyl)-4-carboxypiperidine pyrrolidide oxalate melting at about 184.6–185.6° C.

1 - [γ-(2-thenoyl)propyl]-4-(3-methoxyphenyl)-4-carboxypiperidine pyrrolidide oxalate melting at about 213.5–214.5° C.

1 - [γ - (2-thenoyl)propyl]-4-(4-fluorophenyl)-4-carboxypiperidine morpholide oxalate melting at about 222.5–223.5° C.

Example 47

To a stirred solution of 7.3 parts of 4-(4-chlorophenyl)-4-carboxypiperidine pyrrolidide, 7.8 parts of sodium carbonate, 0.1 part of potassium iodide in 60 parts of 4-methyl-2-pentanone is added portionwise a solution of 6.6 parts of 2-(γ-chlorobutyryl)thiophene in 60 parts of 4-methyl-2-pentanone. The mixture is refluxed for 40 hours, cooled, and partitioned between water and ether. The organic solution is separated, diluted with ether to a volume of 800 parts, dried over potassium carbonate, and saturated with hydrogen chloride. The oil which forms is separated. It solidifies by the addition of acetone and is then collected on a filter and triturated with acetone to yield 1-[γ-(2-thenoyl)propyl]-4-(4-chlorophenyl)-4-carboxypiperidine pyrrolidide hydrochloride melting at about 233.5–235.5° C.

Example 48

To a stirred solution of 5.3 parts of 4-(4-methoxyphenyl)-4-carboxypiperidine pyrrolidide, 5.7 parts of sodium carbonate, 0.1 part of potassium iodide in 80 parts of 4-methyl-2-pentanone is added portionwise a solution of 4.9 parts of 2-(γ-chlorobutyryl)thiophene in 40 parts of 4-methyl-2-pentanone. This mixture is then stirred and refluxed for 40 hours, cooled, partitioned between water and ether. The organic layer is separated, dried, and evaporated. The residue is dissolved in methanol and to this solution an excess of oxalic acid is added. The solid which precipitates is collected on a filter and then triturated with a 3:1 mixture of diisopropyl ether and methanol to yield 1-[γ-(2-thenoyl)propyl]-4-(4-methoxyphenyl)-4-carboxypiperidine pyrrolidide oxalate melting at about 174–178° C. with decomposition. The compound has the formula

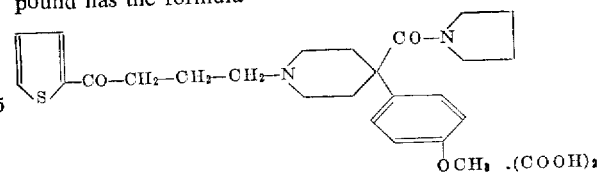

Example 49

A mixture of 4.6 parts of 2-(γ-chlorobutyryl)-thiophene, 5 parts of 3β-methyl-4-phenyl-4-carboxypiperidine morpholide, 0.1 part of potassium iodide, 5.5 parts of sodium carbonate in 120 parts of 4-methyl-2-pentanone is refluxed for 20 hours and filtered. The filtrate is boiled with activated charcoal and then evaporated. The residue is dissolved in diisopropyl ether. This solution is saturated with hydrogen chloride gas and the solid which precipitates is collected on a filter, boiled in butanone, and then dried to yield 1-[γ-(2-thenoyl)propyl]-3β-methyl-4-phenyl-4-carboxypiperidine morpholide hydrochloride melting at about 235–238° C.

Example 50

To a stirred mixture of 8.5 parts of 4-(3-tolyl)-4-carboxypiperidine morpholide, 6.4 parts of sodium carbonate, 0.1 part of potassium iodide in 60 parts of 4-methyl-2-pentanone is added portionwise a solution of 5.3 parts of 2-(γ-chlorobutyryl)thiophene in 60 parts of 4-methyl-2-pentanone. The mixture is then refluxed for 42 hours, cooled, and partitioned between water and ether. The ether layer is separated, dried over potassium carbonate, and filtered. Dry hydrogen chloride gas is passed through the solution. The oil which forms solidifies upon standing overnight at room temperature. The solid is then collected on a filter, triturated with acetone, and dried to yield 1-[γ-(2-thenoyl)propyl]-4-(3-tolyl)-4-carboxypiperidine morpholide hydrochloride melting at about 237–240° C.

Example 51

To a stirred solution of 7.2 parts of 4-(4-tolyl)-4-carboxypiperidine morpholide, 7.8 parts of sodium carbonate, 0.1 part of potassium iodide in 120 parts of 4-methyl-2-pentanone is added portionwise 6.6 parts of 2-(γ-chlorobutyryl)thiophene. The mixture is then refluxed for 22 hours, cooled, and partitioned between water and ether. The ethereal solution is separated, dried over potassium carbonate, saturated with hydrogen chloride gas, and then evaporated. The residue is recrystallized from a 8:1 mixture of acetone and 2-propanol to yield 1-[γ-(2-thenoyl)propyl]-4-(4-tolyl)-4-carboxypiperidine morpholide hydrochloride melting at about 245–247° C.

Example 52

A mixture of 1.5 parts of γ-chloro-5-fluorobutyrophenone, 3.5 parts of 4-phenylpiperidine-4-carboxyamide, 0.1 part of potassium iodide in 80 parts of toluene is heated in a sealed tube for 72 hours at 150° C. and then filtered. The filtrate is evaporated and the residue washed with anhydrous ether. After boiling in 2-propanol, the undissolved material is collected on a filter and dried to yield 1-[γ-(4-fluorobenzoyl)propyl]-4-phenylpiperidine-4-carboxamide hydrochloride melting at about 250.6–252° C. with decomposition.

*Example 53*

A mixture of 6 parts of γ-chloro-4-fluorobutyrophenone, 6 parts of 3α-methyl-4-phenylpiperidine-4-carboxamide, 8.5 parts of sodium carbonate, 0.1 part of potassium iodide, and 200 parts of 4-methyl-2-pentanone is refluxed for 72 hours and then filtered. The filtrate is evaporated and the residue is dissolved in anhydrous ether. This solution is saturated with hydrogen chloride gas and the solid precipitate is collected on a filter and recrystallized from 2-propanol to yield 1-[γ-(4-fluorobenzoyl)propyl] - 3α - methyl-4-phenylpiperidine-4-carboxamide hydrochloride melting at about 229.5–231° C.

*Example 54*

A mixture of 6 parts of γ-chloro-4-fluorobutyrophenone, 6 parts of 3β-methyl-4-phenylpiperidine-4-carboxamide, 0.1 part of potassium iodide, 8.5 parts of sodium carbonate in 200 parts of 4-methyl-2-pentanone is refluxed for 72 hours and the solid precipitate is collected on a filter. This precipitate is then washed with water, dried, and recrystallized from 2-propanol to yield 1-[γ-(4-fluorobenzoyl)propyl] - 3β - methyl-4-phenylpiperidine carboxamide melting at about 169.6–171° C.

*Example 55*

A mixture of 5.4 parts of γ-chloro-4-fluorobutyrophenone, 5.5 parts of 4-(4-tolyl)piperidine-4-carboxamide, 8 parts of sodium carbonate, 0.1 part of potassium iodide, and 120 parts of 4-methyl-2-pentanone is refluxed for 72 hours, cooled, and filtered. The filtrate is boiled with activated charcoal and then evaporated. The residue is dissolved in either and the solution is chilled at —20° C. to yield a precipitate which is collected on a filter and then recrystallized from 2-propanol to yield 1-[γ-(4-fluorobenzoyl)propyl] - 4 - (4-tolyl)piperidine-4-carboxamide melting at about 145–148.6° C.

By substituting 5.9 parts of 4-(4-ethylphenyl)piperidine-4-carboxamide in the above procedure, 1-[γ-(4-fluorobenzoyl)propyl] - 4 - (4-ethylphenyl)piperidine-4-carboxamide is obtained. The compound has the formula

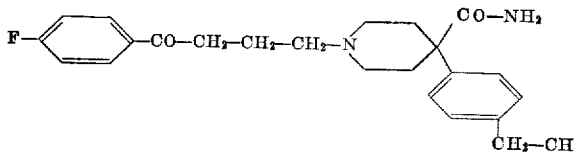

*Example 56*

A mixture of 4.4 parts of γ-chloro-4-fluorobutyrophenone, 4.5 parts of 4-phenylpiperidine-4-(N-methyl)carboxamide, 6.4 parts of sodium carbonate, 0.1 part of potassium iodide, and 120 parts of 4-methyl-2-pentanone is refluxed for 72 hours, cooled, and then partitioned between water and ether. The ethereal solution is separated, dried over potassium carbonate, and then evaporated. The solid residue is washed with diisopropyl ether and dried to yield 1-[γ-(4-fluorobenzoyl)propyl]-4-phenylpiperidine-4-(N-methyl)carboxamide melting at about 143–144° C. The compound has the structural formula

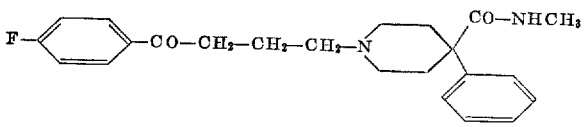

*Example 57*

The free base of 4-phenylpiperidine-4-(N-phenyl)carboxamide hydrochloride is liberated by dissolving 6.4 parts of the salts in water, rendering the solution alkaline, extracting the solution with chloroform and evaporating the solvent. To a mixture of the residue, 6.4 parts of sodium carbonate and 0.1 part of potassium iodide, in 80 parts of 4-methyl-2-pentanone is added portionwise a solution of 5.6 parts of γ-chloro-4-fluorobutyrophenone, in 60 parts of 4-methyl-2-pentanone. The mixture is then refluxed for 40 hours, cooled, and partitioned between water and ether. The ethereal layer is separated and dried. To this solution is added oxalic acid and the ether is then evaporated to induce precipitation. The solid precipitate is collected on a filter and dried to yield 1-[γ-(4-fluorobenzoyl)propyl] - 4 - phenylpiperidine - 4 - (N-phenyl)carboxamide oxalate melting at about 202.5° C.

*Example 58*

The free base of 4-phenylpiperidine-4-(N-benzyl)-carboxamide hydrochloride is liberated by dissolving 6.6 parts of the salt in water, rendering the solution alkaline, extracting the solution with ether, and evaporating the ether extract. The residue is dissolved in 60 parts of 4-methyl-2-pentanone. To this solution are added 6.4 parts of sodium carbonate, 0.1 part of potassium iodide, and 5.6 parts of γ-chloro-4-fluorobutyrophenone in 60 parts of 4-methyl-2-pentanone. This mixture is then stirred and refluxed for 40 hours, cooled, and partitioned between water and ether. After separation, the ethereal solution is dried over potassium carbonate and saturated with hydrogen chloride gas. The sticky precipitate is collected on a filter and then triturated with acetone to yield 1-[γ-(4 - fluorobenzoyl)propyl] - 4 - phenylpiperidine - 4-(N-benzyl)carboxamide hydrochloride melting at about 231.5–232.8° C.

*Example 59*

A mixture of 5.2 parts of γ-chloro-4-fluorobutyrophenone, 5.6 parts of 4-phenylpiperidine-4-(N,N-dimethyl)carboxamide, 0.1 part of potassium iodide, 7.7 parts of sodium carbonate in 120 parts of 4-methyl-2-pentanone is refluxed for 72 hours, cooled and partitioned between water and ether. The organic layer is separated, dried over potassium carbonate, and then evaporated. The solid residue is triturated with diisopropyl ether to yield 1-[γ - (4 - fluorobenzoyl)propyl] - 4 - phenylpiperidine - 4 - (N,N - dimethyl)carboxamide melting at about 119–120° C.

*Example 60*

A mixture of the free base of 8 parts of 3α-methyl-4-phenylpiperidine-4-(N,N-dimethyl)carboxamide hydrochloride, 7.1 parts of γ-chloro-4-fluorobutyrophenone, 9 parts of sodium carbonate, 0.1 part of potassium iodide in 120 parts of 4-methyl-2-pentanone is refluxed for 72 hours, cooled, and filtered. The filtrate is evaporated and the residue dissolved in 2-propanol. After the addition of oxalic acid in 2-propanol to this solution, the mixture is boiled for 5 minutes and then chilled at —20° C. The solid which precipitates upon standing is collected on a filter, washed with 2-propanol, boiled in acetone, and dried to yield 1-[γ-(4-fluorobenzoyl)propyl]-3α-methyl-4-phenylpiperidine-4-(N,N - dimethyl)carboxamide oxalate melting at about 168.4–169.8° C. with decomposition.

*Example 61*

To a stirred solution of 4 parts of 3β-methyl-4-phenylpiperidine-4-(N,N-dimethyl)carboxamide, 5 parts of sodium carbonate, 0.1 part of potassium iodide, and 44 parts of 4-methyl-2-pentanone is added portionwise a solution of 4.6 parts of γ-chloro-4-fluorobutyrophenone, in 12 parts of 4-methyl-2-pentanone. The mixture is refluxed and stirred for 40 hours and then filtered. The filtrate is evaporated and the residue dissolved in ether.

The ethereal solution is saturated with hydrogen chloride gas and the solid precipitate is collected on a filter and then recrystallized from butanone to yield 1-[γ-(4-fluorobenzoyl)propyl]-3β-methyl-4-phenylpiperidine - 4 - (N,N-dimethyl)carboxamide hydrochloride melting at about 203.2–204.2° C.

Example 62

To a stirred solution of 5 parts of 4-(3-tolyl)-piperidine-4-(N,N-dimethyl)carboxamide, 6.4 parts of sodium carbonate, 0.1 part of potassium iodide, and 120 parts of 4-methyl-2-pentanone is added portionwise a solution of 5.6 parts of γ-chloro-4-fluorobutyrophenone in 60 parts of 4-methyl-2-pentanone. The mixture is then refluxed for 42 hours, cooled, and partitioned between water and ether. The ethereal layer is separated, dried over potassium carbonate, and then chilled. The solid which precipitates is collected on a filter and recrystallized from boiling diisopropyl ether to yield 1-[γ-(4-fluorobenzoyl)propyl]-4-(3-tolyl)piperidine-4-(N,N-dimethyl)carboxamide melting at about 122.5–123.5° C. The compound has the formula

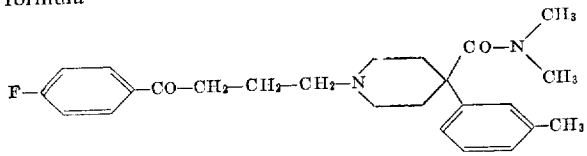

Example 63

To a stirred solution of 6.2 parts of 4-(4-tolyl)piperidine-4-(N,N-dimethyl)carboxamide, 7.8 parts of sodium carbonate, 0.1 part of potassium iodide in 120 parts of 4-methyl-2-pentanone are added portionwise 7 parts of γ-chloro-4-fluorobutyrophenone. The mixture is then refluxed for 36 hours, washed twice with water, and diluted with ether. The organic solution is evaporated and the residue washed with petroleum ether and then dried to yield 1-[γ-(4-fluorobenzoyl)propyl]-4-(4-tolyl)piperidine-4-(N,N-dimethyl)carboxamide melting at about 132.6–135° C.

Example 64

To a stirred solution of 6.7 parts of 4-(4-chlorophenyl)piperidine-4-(N,N-dimethyl)carboxamide, 7.8 parts of sodium carbonate, 0.1 part of potassium iodide, and 60 parts of 4-methyl-2-pentanone is added portionwise a solution of 7 parts of γ-chloro-4-fluorobutyrophenone, in 60 parts of 4-methyl-2-pentanone. The mixture is then refluxed for 42 hours with stirring, cooled, and partitioned between water and ether. The organic solution is separated and concentrated to a small volume to initiate precipitation. The solid is collected on a filter and washed with diisopropyl ether to yield 1-[γ-(4-fluorobenzoyl)propyl]-4-(4-chlorophenyl)piperidine-4 - (N,N-dimethyl)carboxamide melting at about 135–137° C.

Example 65

To a stirred mixture of 5.2 parts of 4-(4-methoxyphenyl)piperidine-4-(N,N - dimethyl)carboxamide, 6.4 parts of sodium carbonate, 0.1 part of potassium iodide, in 60 parts of 4-methyl-2-pentanone is added portionwise a solution of 5.6 parts of γ-chloro-4-fluorobutyrophenone in 60 parts of 4-methyl-2-pentanone. This mixture is refluxed for 40 hours, cooled, partitioned between water and ether. After separation the organic solution is dried and evaporated. The residue is dissolved in ethanol. To this solution is added oxalic acid in ethanol. After chilling the solid precipitate which forms is collected on a filter and recrystallized from ethanol to yield 1-[γ-(4-fluorobenzoyl)propyl] - 4 - (4 - methoxyphenyl)piperidine-4-(N,N-dimethyl)carboxamide oxalate melting at about 160–168° C.

By substituting 4-(3-chlorophenyl)piperidine-4-(N,N-dimethyl)carboxamide in the procedure of the above paragraph, 1 - [γ - (4 - fluorobenzoyl)propyl] - 4 - (4-chlorophenyl)piperidine - 4 - (N,N - dimethyl)carboxamide oxalate is obtained. It has the formula

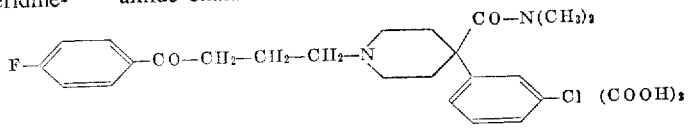

Example 66

To a mixture of the free base of 7.4 parts of 4-phenylpiperidine - 4 - (N,N-diethyl)carboxamide hydrochloride, 7.8 parts of sodium carbonate, 0.1 part of potassium iodide, and 60 parts of 4-methyl-2-pentanone are added portionwise 7 parts of γ-chloro-4-fluorobutyrophenone, in 60 parts of 4-methyl-2-pentanone. The mixture is then refluxed for 20 hours, cooled, and washed with water. The organic solution is dried over potassium carbonate and evaporated. The residue is dissolved in ether and evaporated once again. The solid residue is triturated with diisopropyl ether and then dried to yield 1-[γ-(4-fluorobenzoyl)propyl] - 4 - phenylpiperidine - 4 - (N,N-diethyl)carboxamide melting at about 81–83.4° C.

Example 67

A mixture of 3.2 parts of γ-chloro-4-fluorobutyrophenone, 4.5 parts of 3α-methyl-4-phenylpiperidine-4-(N,N-diethyl)carboxamide, 5.5 parts of sodium carbonate, 0.1 part of potassium iodide in 120 parts of 4-methyl-2-pentanone is refluxed for 72 hours and filtered. The filtrate is boiled in activated charcoal and then evaporated. The residue is dissolved in 2-propanol and to this solution is added a solution of oxalic acid in 2-propanol. The solid which precipitates is collected on a filter and then recrystallized from 2-propanol to yield 1-[γ-(4-fluorobenzoyl)propyl] - 3α - methyl - 4 - phenylpiperidine-4-(N,N-diethyl)carboxamide oxalate melting at about 161–165° C.

Example 68

A mixture of 4.4 parts of γ-chloro-4-fluorobutyrophenone, 5 parts of 3β-methyl-4-phenylpiperidine-4-(N,N-diethyl)carboxamide, 5.3 parts of sodium carbonate, 0.1 part of potassium iodide, and 120 parts of 4-methyl-2-pentanone is refluxed for 40 hours and then filtered. The filtrate is boiled in activated charcoal and then evaporated. The residue is dissolved in diisopropyl ether and hydrogen chloride gas is passed through the solution. After evaporation, the residue is recrystallized from butanone by chilling at —20° C. to yield 1-[γ-(4-fluorobenzoyl)propyl] - 3β - methyl - 4 - phenylpiperidine - 4- (N,N-diethyl)carboxamide hydrochloride melting at about 179–180° C.

Example 69

The free base of 4-phenylpiperidine-4-(N-methyl)-4-(N-phenyl)carboxamide hydrochloride is liberated by dissolving 6.6 parts of a salt in water, rendering the solution alkaline, extracting the solution with ether, and evaporating the ether extract. To a stirred mixture of this residue, 6.4 parts of sodium carbonate, 0.1 part of potassium iodide, and 60 parts of 4-methyl-2-pentanone is added portionwise a solution of 5.6 parts of γ-chloro-4-fluorobutyrophenone in 60 parts of 4-methyl-2-pentanone. After refluxing for 40 hours the mixture is cooled and partitioned between water and ether. The layers are separated and the ether layer is dried and evaporated. The residue is dissolved in ethanol and to this solution is then added a solution of oxalic acid in ethanol. The solid precipitate immediately is collected on a filter and dried to yield 1-[γ-(4-fluorobenzoyl)-propyl]-4-phenylpiperidine - 4 - (N - methyl) - 4 - (N - phenyl) - carboxamide oxalate melting at about 211–212° C.

*Example 70*

To a stirred mixture of 6.8 parts of γ-chloro-4-fluorobutyrophenone, 7.8 parts of sodium carbonate, 0.1 part of potassium iodide, and 60 parts of 4-methyl-2-pentanone is added portionwise a solution of 7 parts of 4-phenyl-4-carboxypiperidine piperidide in 60 parts of 4-methyl-2-pentanone. The mixture is then refluxed for 36 hours, cooled, and filtered. The filtrate is evaporated and the residue dissolved in ether. The ethereal solution is then evaporated and the solid residue washed with petroleum ether and dried to yield 1-[γ-(4-fluorobenzoyl)propyl]-4-phenyl-4-carboxypiperidine piperidide melting at about 102.5–103.5° C.

*Example 71*

A mixture of the liberated base of 9.66 parts of 3α-methyl-4-phenyl-4-carboxypiperidine piperidide hydrochloride, 9.5 parts of sodium carbonate, 6 parts of γ-chloro-4-fluorobutyrophenone, 0.1 part of potassium iodide, and 135 parts of 4-methyl-2-pentanone is refluxed and stirred for 72 hours, cooled, and filtered. The filtrate is boiled with activated charcoal and then evaporated. The residue is dissolved in 2-propanol and to this solution is then added a solution of oxalic acid in 2-propanol. After boiling for 5 minutes and then chilling at −20° C., the solid precipitate is collected on a filter and washed with 2-propanol and diisopropyl ether to yield 1-[γ-(4-fluorobenzoyl)propyl]-3α-methyl-4-carboxypiperidine piperidide oxalate melting at about 173–176° C.

*Example 72*

A mixture of 3.92 parts of γ-chloro-4-fluorobutyrophenone, 4 parts of 3β-methyl-4-phenyl-4-carboxypiperidine piperidide, 4.5 parts of sodium carbonate, 0.1 part of potassium iodide, and 120 parts of 4-methyl-2-pentanone is stirred and refluxed for 20 hours and then filtered. The filtrate is boiled with activated charcoal and then evaporated. The residue is dissolved in diisopropyl ether and the solution is chilled at −20° C. to yield 1-[γ-(4-fluorobenzoyl)propyl] - 3β - methyl - 4 - phenyl - 4 - carboxypiperidine piperidide melting at about 88–89° C.

By substituting 5 parts of ω-chloro-4-fluorohexanophenone in the procedure of the paragraph, 1-[ω-(4-fluorobenzoyl)pentyl] - 3β - methyl - 4 - phenyl - 4 - carboxypiperidine piperidide is obtained. The compound has the formula

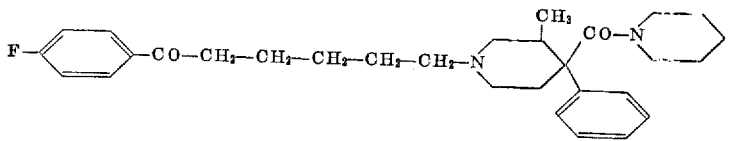

*Example 73*

To a stirred solution of 6.4 parts of 4-phenyl-4-carboxypiperidine pyrrolidide, 7.8 parts of sodium carbonate, 0.1 part of potassium iodide in 120 parts of 4-methyl-2-pentanone are added portionwise 7 parts of γ-chloro-4-fluorobutyrophenone. The mixture is then refluxed for 36 hours, cooled, and filtered. The filtrate is evaporated. The oily residue is dissolved in ether and evaporated to yield a solid residue which is triturated with petroleum ether and then dried to yield 1-[γ-(4-fluorobenzoyl)propyl]-4-phenyl-4-carboxypiperidine pyrrolidide melting at about 104–105.2° C.

*Example 74*

A mixture of 4 parts of γ-chloro-4-fluorobutyrophenone, 5.6 parts of 3α-methyl-4-phenyl-4-carboxypiperidine pyrrolidide, 6 parts of sodium carbonate, 0.1 part of potassium iodide in 120 parts of 4-methyl-2-pentanone is refluxed for 72 hours and filtered. The filtrate is boiled with activated charcoal and then evaporated. The residue is dissolved in 2-propanol and to this solution is added oxalic acid in 2-propanol. The solid precipitate is collected on a filter and recrystallized from 2-propanol to yield 1 - [γ - (4-fluorobenzoyl)propyl]-3α-methyl-4-phenyl-4-carboxypiperidine pyrrolidide oxalate melting at about 188.4–189.6° C.

*Example 75*

To a stirred mixture of 4 parts of 3β-methyl-4-phenyl-4-carboxypiperidine pyrrolidide, 4.65 parts of sodium carbonate, 0.1 part of potassium iodide, and 44 parts of 4-methyl-2-pentanone is added portionwise a solution of 4.1 parts of γ-chloro-4-fluorobutyrophenone in 16 parts of 4-methyl-2-pentanone. This mixture is stirred and refluxed for 22 hours and then filtered. The filtrate is evaporated and the residue dissolved in diisopropyl ether. After chilling at −20° C. the solid precipitate is collected on a filter and dried to yield 1-[γ-(4-fluorobenzoyl)propyl]-3β-methyl-4-phenyl-4-carboxypiperidine pyrrolidide melting at about 100.2–102° C.

*Example 76*

To a stirred solution of 5.5 parts of 4-(3-tolyl)-4-carboxypiperidine pyrrolidide, 6.4 parts of sodium carbonate, 0.1 part of potassium iodide, and 60 parts of 4-methyl-2-pentanone is added a solution of 5.6 parts of γ-chloro-4-fluorobutyrophenone in 60 parts of 4-methyl-2-pentanone. The mixture is then refluxed for 42 hours, cooled, and partitioned between water and ether. The organic solution is separated, dried over potassium carbonate, and evaporated. The solid residue is triturated with diisopropyl ether to yield 1-[γ-(4-fluorobenzoyl)propyl]-4-(3-tolyl)-4-carboxypiperidine pyrrolidide melting at about 93.8–94.8° C. The oxalate of this compound is formed by treating a methanolic solution of the base with oxalic acid in methanol and melts at about 209–210.5° C.

*Example 77*

To a stirred solution of 6.8 parts of 4-(4-tolyl)-4-carboxypiperidine pyrrolidide, 7.8 parts of sodium carbonate, 0.1 part of potassium iodide, and 70 parts of 4-methyl-2-pentanone is added portionwise a solution of 7 parts of γ-chloro-4-fluorobutyrophenone, in 70 parts of 4-methyl-2-pentanone. The mixture is then refluxed for 22 hours, cooled, and partitioned between water and ether. After separation, the ethereal layer is dried over potassium carbonate, and saturated with hydrogen chloride gas, and evaporated. The oily residue is treated with cold water and then solidifies upon standing. It is collected on a filter and washed with petroleum ether to yield 1 - [γ - (4 - fluorobenzoyl)propyl] - 4-(4 - tolyl) - 4-carboxypiperidine pyrrolidide hydrochloride melting at about 143.4–146.8° C.

*Example 78*

To a stirred mixture of 5.5 parts of 4-(4-fluorophenyl)-4-carboxypiperidine pyrrolidide, 6.4 parts of sodium carbonate, 0.1 part of potassium iodide, and 120 parts of 4-methyl-2-pentanone are added portionwise 5.6 parts of γ-chloro-4-fluorobutyrophenone. This mixture is then refluxed for 42 hours, cooled, and washed with water. The organic solution is dried and evaporated. The residue is dissolved in methanol. To this solution is added a methanolic solution of oxalic acid. The solid which precipitates upon standing at −20° C. is collected and dried to yield 1-[γ-(4-fluorobenzoyl)propyl]-4-(4-fluorophenyl)-4-carboxypiperidine pyrrolidide oxalate melting at about 199.5–201° C. The compound has the structural formula

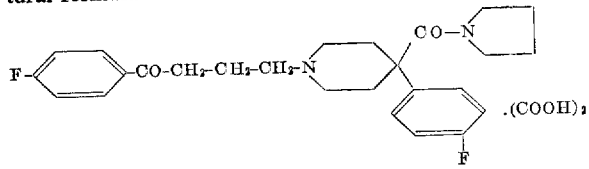

*Example 79*

To a stirred solution of 7.3 parts of 4-(4-chlorophenyl)-4-carboxypiperidine pyrrolidide, 7.8 parts of sodium carbonate, 0.1 part of potassium iodide, and 60 parts of 4-methyl-2-pentanone is added portionwise a solution of 7 parts of γ-chloro-4-fluorobutyrophenone in 60 parts of 4-methyl-2-pentanone. After refluxing for 40 hours, the mixture is stirred and partitioned between water and ether. The layers are separated and the organic layer diluted with ether to a total volume of 800 parts. After drying over potassium carbonate the organic solution is saturated with hydrogen chloride gas to yield an oil. The solvent is decanted. The oily residue partially solidified upon scratching. This precipitate is then recrystallized successively from a 6:5 mixture of acetone and 2-propanol, water, and then acetone by concentrating the solution to about one-half of its original volume and then chilling it to 0° C. The compound, 1-[γ-(4-fluorobenzoyl)propyl] - 4-(4-chlorophenyl) - 4 - carboxypiperidine pyrrolidide hydrochloride melts at about 212–213° C.

*Example 80*

A mixture of 4.1 parts of γ-chloro-4-fluorobutyrophenone, 5 parts of 3α-methyl-(4-chlorophenyl)-4-carboxypiperidine pyrrolidide, 4.8 parts of sodium carbonate, and 0.1 part of potassium iodide, in 120 parts of 4-methyl-2-pentanone is stirred and refluxed for 20 hours. The mixture is filtered and the filtrate decolorized and evaporated. The residue is dissolved in diisopropyl ether and the solution saturated with hydrogen chloride gas. The solid precipitate is recrystallized from 2-propanol by chilling at −20° C. to yield 1-[γ-(4-chlorobenzoyl)-propyl]-3α-methyl-4-(4-chlorophenyl) - 4 - carboxypiperidine pyrrolidide hydrochloride melting at about 213–214° C.

By substituting 4.8 parts of γ-chloro-4-iodobutyrophenone in the above procedure, 1-[γ-(4-iodobenzoyl)-propyl]-3α-methyl-4-(4-chlorophenyl) - 4 - carboxypiperidine pyrrolidide hydrochloride is obtained. The compound has the formula

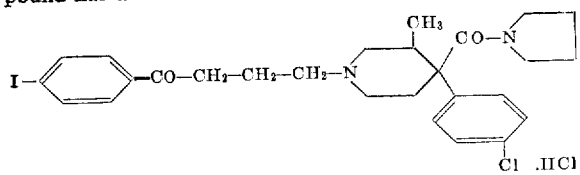

*Example 81*

A mixture of 3.2 parts of γ-chloro-4-fluorobutyrophenone, 4.3 parts of 4-phenyl-4-carboxypiperidine morpholide, 5 parts of sodium carbonate, 0.1 part of potassium iodide in 120 parts of 4-methyl-2-pentanone is refluxed for 72 hours and then filtered while hot. The filtrate is cooled, diluted with ether, and saturated with hydrogen chloride gas. The sticky precipitate which forms is separated and treated with acetone and then dried to yield 1 - [γ - (4 - fluorobenzoyl)propyl] - 4-phenyl-4-carboxy- piperidine morpholide hydrochloride melting at about 255–257.3° C.

*Example 82*

To a mixture of the free base of 4.5 parts of the hydrochloride of 3α - methyl - 4 - phenyl-4-carboxypiperidine morpholide, 64 parts of 4-methyl-2-pentanone, 4.9 parts of sodium carbonate, and 0.1 part of potassium iodide is added a solution of 4.3 parts of γ-chloro-4-fluorobutyrophenone in 16 parts of 4-methyl-2-pentanone. The mixture is then stirred and refluxed for 68 hours and filtered. The filtrate is evaporated and the residue is dissolved in diisopropyl ether. The solid which precipitates on standing at room temperature is collected on a filter and then boiled in diisopropyl ether to yield 1-[γ-(4-fluorobenzoyl)propyl]-3α-methyl-4-phenyl-4 - carboxypiperidine morpholide melting at about 119–120° C.

*Example 83*

A mixture of 4.8 parts of γ-chloro-4-fluorobutyrophenone, 5 parts of 3β-methyl-4-phenyl-4-carboxypiperidine morpholide, 5.5 parts of sodium carbonate, 0.1 part of potassium iodide, and 120 parts of 4-methyl-2-pentanone is refluxed for 40 hours and then filtered. The filtrate is boiled with activated charcoal and then evaporated. The residue is dissolved in dissopropyl ether, filtered to remove impurities and then saturated with hydrogen chloride. The solid precipitate is collected on a filter and recrystallized from butanone to yield 1-[γ-(4-fluorobenzoyl)-propyl]-3β-methyl-4 - phenyl - 4 - carboxypiperidine morpholide hydrochloride melting at about 203.5–205° C.

*Example 84*

To a stirred mixture of 2.9 parts of 4-(3-methoxyphenyl)-4-carboxypiperidine pyrrolidide, 3.2 parts of sodium carbonate, 0.1 part of potassium iodide, and 80 parts of 4-methyl-2-pentanone is added portionwise a solution of 2.8 parts of γ-chloro-4-fluorobuyrophenone in 4-methyl-2-pentanone. This mixture is refluxed for 42 hours, cooled, washed with water, dried, and then evaporated. To the oily residue in methanol is added a methanolic solution of oxalic acid. The solid which precipitates upon standing at room temperature is 1-[γ-(4-fluorobenzoyl)propyl]-4-(3-methoxyphenyl) - 4 - carboxypiperidine pyrrolidide oxalate melting at about 218.5–219.5° C. The compound has the formula

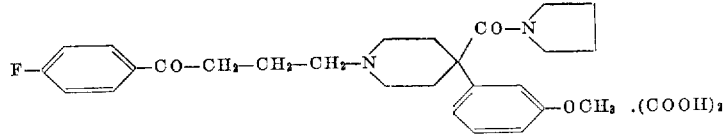

By substituting 3 parts of 4-(3-chlorophenyl)-4-carboxypiperidine pyrrolidide in the procedure of the above paragraph, 1-[γ-(4-fluorobenzoyl)propyl] - 4 - (3-chlorophenyl)-4-carboxypiperidine pyrrolidide oxalate is obtained.

By substituting equimolar amounts of the starting materials in the procedure above, the following compounds may be obtained:

1-[γ-(4 - fluorobenzoyl)propyl] - 4 - (4 - ethylphenyl)-4-carboxypiperidine pyrrolidide oxalate melting at about 198–199° C.

1 - [γ - (4 - fluorobenzoyl)propyl]-4-phenyl-4-carboxypiperidine 2,6-dimethylmorpholide oxalate melting at about 186–187° C.

*Example 85*

To a stirred mixture of 5.8 parts of 4-(3-tolyl)-4-carboxypiperidine morpholide, 6.4 parts of sodium carbonate, 0.1 part of potassium iodide, and 60 parts of 4-methyl-2-pentanone is added portionwise a solution of 5.6 parts of γ-chloro-4-fluorobutyrophenone in 60 parts of 4-methyl-2-pentanone. The mixture is then refluxed for 42 hours, cooled, and partitioned between water and ether. The ether layer is separated, dried over potassium carbonate, and then saturated with hydrogen chloride gas.

The sticky precipitate which solidifies upon scratching is then collected on a filter, triturated with acetone, and dried to yield 1-[γ-(4-fluorobenzoyl)propyl]-4-(3-tolyl)-4-carboxypiperidine morpholide hydrochloride melting at about 239–240.5° C.

*Example 86*

To a stirred solution of 7.2 parts of 4-(4-tolyl)-4-carboxypiperidine morpholide, 7.8 parts of sodium carbonate, 0.1 part of potassium iodide, and 120 parts of 4-methyl-2-pentanone is added portionwise 7 parts of γ-chloro-4-fluorobutyrophenone. The mixture is refluxed for 20 hours, cooled, washed with water, and diluted with ether to a total volume of 1,000 parts, dried over sodium carbonate, and saturated with hydrogen chloride gas. The oil which forms is separated and solidified by the addition of acetone. After drying, the white powder of 1-[γ-(4-fluorobenzoyl)propyl] - 4 - (4-tolyl) - 4-carboxypiperidine morpholide hydrochloride melts at about 226.5–229.3° C.

By substituting 8.5 parts of 4-(4-trifluoromethylphenyl)-4-carboxypiperidine morpholide in the above procedure, 1-[γ-(4 - fluorobenzoyl)propyl] - 4 - (4 - trifluoromethylphenyl)-4-carboxypiperidine morpholide hydrochloride of the formula

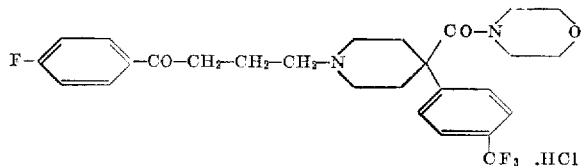

is obtained.

*Example 87*

To a stirred mixture of 4 parts of 4-(4-ethylphenyl)-piperidine-4-(N,N-dimethyl)carboxamide, 4.9 parts of sodium carbonate, 0.1 part of potassium iodide, and 80 parts of 4-methyl-2-pentanone is added portionwise a solution of 4 parts of 2-(γ-chlorobutyryl)thiophene and 40 parts of 4-methyl-2-pentanone. The mixture is refluxed for 50 hours, cooled, washed with water, dried, and evaporated. The oily residue is dissolved in methanol. To this solution is added a methanolic solution of oxalic acid. After chilling at 0° C., the solid which precipitates is collected on a filter and dried to yield 1-[γ-(2-thenoyl)propyl] - 4 - (4 - ethylphenyl)piperidine-4-(N,N-dimethyl)carboxamide oxalate melting at about 209.5–210.2° C.

By substituting the appropriate starting materials in the above procedure, 1-[γ-(4-fluorobenzoyl)propyl]-4-(4-ethylphenyl)-4-carboxypiperidine morpholide oxalate melting at about 197.5–198.5° C. is obtained.

*Example 88*

To a stirred mixture of 5.9 parts of 4-(4-fluorophenyl)-4-carboxypiperidine morpholide, 6.4 parts of sodium carbonate, 0.1 part of potassium iodide, and 80 parts of 4-methyl-2-pentanone, is added portionwise a solution of 5.6 parts of γ-chloro-4-fluorobutyrophenone in 40 parts of 4-methyl-2-pentanone. The mixture is concentrated to about 30 parts. The precipitate is collected on a filter and the filtrate is saved. The precipitate is then recrystallized from a 5:1 mixture of diisopropyl ether and methanol by chilling at −20° C. to yield 1-[γ-(4-fluorobenzoyl)-propyl]-4-(4-fluorophenyl)-4-carboxypiperidine morpholide melting at about 131–132° C. The filtrate saved from above is evaporated and the residue is dissolved in methanol. To that solution is added a methanolic solution of oxalic acid. The solid which precipitates is collected and dried to yield the oxalate of this compound which melts at about 210–213° C.

By substituting 6.3 parts of 4-(4-fluorophenyl)-4-carboxypiperidine 2-methylmorpholide in the above procedure, 1-[γ-(4-fluorobenzoyl)propyl]-4-(4-fluorophenyl)-4-carboxypiperidine 2-methylmorpholide oxalate of the formula

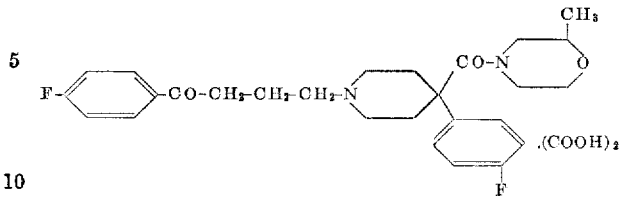

is obtained.

*Example 89*

The free base of 4-(4-fluorophenyl)piperidine-4-(N,N-dimethyl)carboxamide hydrochloride is liberated by dissolving 6.1 parts of the salt in water, rendering the solution alkaline, extracting the solution with ether, and drying and evaporating the ether extract. To the residue 80 parts of 4-methyl-2-pentanone, 6.4 parts of sodium carbonate, 0.1 part of potassium iodide is added portionwise a solution of 5.6 parts of γ-chloro-4-fluorobutyrophenone in 40 parts of 4-methyl-2-pentanone. The mixture is refluxed for 40 hours, washed with water, dried, and then evaporated. To a methanolic solution of the oily residue is added oxalic acid in methanol. After chilling at 0° C., the precipitate formed is collected on a filter and dried to yield 1-[γ-(4-fluorobenzoyl)propyl]-4-(4-fluorophenyl)-piperidine-4-(N,N-dimethyl)carboxamide oxalate melting at about 188.8–193° C. with decomposition.

By substituting equivalent amounts of starting materials in the above procedure, 1-[γ-(4-fluorobenzoyl)propyl]-4-(3 - methoxyphenyl)piperidine-4-(N,N-dimethyl)-carboxamide oxalate melting at about 196–198.6° C. is obtained.

*Example 90*

The free base of 4-phenylpiperidine-4-(N-isopropyl)-carboxamide oxalate is liberated by dissolving 7 parts of the salt in water, rendering the solution alkaline, extracting the solution with ether, and drying and evaporating the ether extract. This residue is dissolved in 120 parts of 4-methyl-2-pentanone and refluxed together with 5.6 parts of γ-chloro-4-fluorobutyrophenone, 6.36 parts of sodium carbonate, and 0.1 part of potassium iodide for 30 hours. The mixture is filtered while hot and the filtrate evaporated. The solid residue is washed with diisopropyl ether to yield 1-[γ-(4-fluorobenzoyl)propyl]-4-phenyl-piperidine-4-(N-isopropyl)carboxamide melting at about 153.5–155° C.

*Example 91*

A mixture of 5.6 parts of γ-chloro-4-fluorobutyrophenone, 6.36 parts of sodium carbonate, 0.1 part of potassium iodide, 7 parts of 4-phenyl-4-carboxypiperidine 4-phenylpiperazide, and 120 parts of 4-methyl-2-pentanone is refluxed for 30 hours, filtered, and then the filtrate is evaporated. The solid residue is triturated with diisopropyl ether to yield 1-[γ-(4-fluorobenzoyl)propyl]-4-phenyl-4-carboxypiperidine 4-phenylpiperazide melting at about 165–166.2° C.

By substituting 6.2 parts of 4-carboxypiperidine piperazide in the above procedure, 1-[γ-(4-fluorobenzoyl)propyl]-4-phenyl-4-carboxypiperidine piperazide of the structural formula

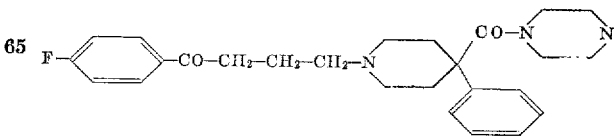

is obtained.

*Example 92*

To a stirred mixture of 4 parts of 4-(4-ethylphenyl)-piperidine-4-(N,N-dimethyl)carboxamide, 4.9 parts of sodium carbonate, 0.1 part of potassium iodide, in 60 parts of 4-methyl-2-pentanone is added portionwise a solution of 4.2 parts of γ-chloro-4-fluorobutyrophenone in 60 parts of 4-methyl-2-pentanone. The mixture is refluxed for 48 hours, cooled, washed with water, dried and evaporated. The solid residue is recrystallized from diisopropyl ether by chilling at —20° C. and then dissolved in methanol. To this solution is added a methanolic solution of oxalic acid. After chilling at 0° C., the solid which precipitates is collected on a filter and dried to yield 1-[γ-(4-fluorobenzoyl)propyl] - 4 - (4-ethylphenyl)piperidine-4-(N,N-dimethyl)carboxamide oxalate melting at about 185.6–187.4° C.

By substituting the appropriate starting materials, the following compounds are obtained:

1-[γ-(4-fluorobenzoy)propyl] - 4 - (3 - chlorophenyl)-piperidine-4-(N,N-dimethyl)carboxamide oxalate melting at about 193.5–196° C.

1-[γ-(4-fluorobenzoyl)propyl]-4-(3-methoxyphenyl)-4-carboxypiperidine morpholide oxalate melting at about 218.5–219.5° C.

1-[γ-(4-fluorobenzoyl)propyl]-4-(2-thienyl)piperidine-4-(N,N-dimethyl)carboxamide oxalate melting at about 192–194° C.

1-[γ-(4-fluorobenzoyl)propyl] - 4 - (2,4 - xylyl)-4-carboxypiperidine pyrrolidide oxalate melting at about 159.6–163.6° C.

1-[γ-(4-fluorobenzoyl)propyl] - 4 - (2,4-xylyl)-piperidine - 4 - (N,N-dimethyl)carboxamide oxalate melting at about 164.4–166.4° C.

*Example 93*

A mixture of 3.92 parts of 2-(γ-chlorobutyryl)-thiophene, 5 parts of 3α-methyl - 4 - (4-chlorophenyl)-4-carboxypiperidine pyrrolidide, 0.1 part of potassium iodide, and 120 parts of 4-methyl-2-pentanone is refluxed for 20 hours, filtered, the filtrate boiled with activated charcoal, and evaporated. The residue is dissolved in diisopropyl ether. Hydrogen chloride gas is introduced into this solution. The solid which precipitates is separated by decantation and then crystallized from 2-propanol by chilling at —20° C. to yield 1-[γ-(2-thenoyl)-propyl]-3α-methyl-4-(4-chlorophenyl) - 4 - carboxypiperidine pyrrolidide hydrochloride melting at about 223.5–225.5° C.

*Example 94*

To a stirred mixture of 5.5 parts of 4-(4-fluorophenyl)-4-carboxypiperidine pyrrolidide, 6.4 parts of sodium carbonate, 0.1 part of potassium iodide, and 120 parts of 4-methyl-2-pentanone are added portionwise 5.3 parts of 2 - (γ - chlorobutyryl)thiophene. This mixture is then stirred and then refluxed for 42 hours, cooled, washed with water, dried, and evaporated. The residue is dissolved in methanol. To this solution is added oxalic acid in methanol and after cooling at —20° C., a precipitate forms which is 1-[γ - (2 - thenoyl)propyl] - 4 - (4-fluorophenyl)-4-carboxypiperidine pyrrolidide oxalate melting at about 204–210° C. The free base of this compound is formed by dissolving the salt in water, rendering the solution alkaline, and extracting the solution with ether, and then drying and evaporating the ether extract. The base then melts at 100.4–103.2° C.

*Example 95*

The free base of 4-(2-thienyl)-4-carboxypiperidine pyrrolidide hydrochloride is liberated by dissolving 4.5 parts of the salt in water, rendering the solution alkaline, extracting the solution with ether, and then drying and evaporating the ether extract. To a stirred mixture of the residue, 4.9 parts of sodium carbonate, 0.1 part of potassium iodide, and 80 parts of 4-methyl-2-pentanone is added portionwise a solution of 4 parts 2-(γ-chlorobutyryl)thiophene in 40 parts 4 - methyl - 2 - pentanone. This mixture is then refluxed for 42 hours, cooled, washed with water, dried, and evaporated. To a methanolic solution of the oily residue is added oxalic acid in methanol. After chilling at —20° C., the solid which precipitates is collected and recrystallized from a super-saturated solution of water to yield 1-[γ - (2 - thenoyl)propyl] - 4 - (2-thienyl)-4-carboxypiperidine pyrrolidide oxalate melting at about 175–180° C. The compound has the formula

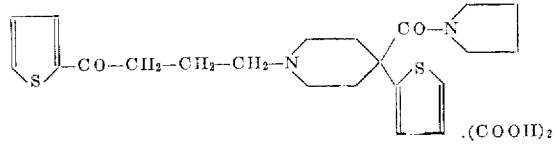

*Example 96*

To a stirred mixture of 5.3 parts of 4-(3-chlorophenyl)-piperidine - 4 - (N,N-dimethyl)carboxamide, 6.4 parts of sodium carbonate, 0.1 part of potassium iodide, and 60 parts of 4-methyl-2-pentanone is added portionwise a solution of 5.3 parts of 2-(γ-chlorobutyryl)thiophene in 60 parts of 4-methyl-2-pentanone. The mixture is refluxed for 60 hours, cooled, washed with water, dried, and evaporated. The residue is dissolved in methanol. To this solution is added a methanolic solution of oxalic acid. The solid which precipitates is collected on a filter and dried to yield 1-[γ-(2-thenoyl)propyl]-4-(3-chlorophenyl)-piperidine - 4 - (N,N-dimethyl)carboxamide oxalate melting at about 197–198.5° C.

By substituting equivalent quantities of the starting materials of the above procedure the following compounds are obtained:

1-[γ-(4-fluorobenzoyl)propyl] - 4-(3-chlorophenyl)-4-carboxypiperidine pyrrolidide oxalate melting at about 217–218° C.

1-[γ-(2-thenoyl)propyl] - 4-(4-ethylphenyl)-4-carboxypiperidine morpholide oxalate melting at about 206.5–207.5° C.

*Example 97*

The free base of 4-(3-methoxyphenyl)-4-carboxypiperidine morpholide hydrochloride is liberated by dissolving 5.1 parts of salt and water, rendering the solution alkaline, extracting the solution with chloroform, and evaporating with chloroform solvent. To the residue, 4.9 parts of sodium carbonate, 0.1 part of potassium iodide, and 60 parts of 4-methyl-2-pentanone is added portionwise 4 parts of 2-(γ-chlorobutyryl)thiophene in 60 parts of 4-methyl-2-pentanone. This mixture is refluxed for 60 hours, cooled, washed with water, dried and evaporated. The residue is dissolved in ether. Hydrogen chloride gas is passed through the solution and the solid which precipitates is collected on a filter and then recrystallized from acetone to yield 1-[γ-(2-thenoyl)propyl]-4-(3-methoxyphenyl) - 4-carboxypiperidine morpholide hydrochloride melting at about 217–222.5° C.

*Example 98*

To a stirred mixture of 5.3 parts of 4-(3-chlorophenyl) piperidine-4-(N,N-dimethyl)carboxamide, 6.4 parts of sodium carbonate, 0.1 part of potassium iodide, and 60 parts of 4-methyl-2-pentanone is added portionwise a solution of 5.1 parts of γ-chlorobutyrophenone and 60 parts of 4-methyl-2-pentanone. This mixture is then refluxed for 60 hours, cooled, washed with water, and evaporated. The residue is dissolved in methanol and to this solution is added oxalic acid in methanol. The precipitate is collected on a filter and washed with acetone to yield 1-(γ-benzoylpropyl)-4-(3-chlorophenyl)-piperidine - 4 - (N,N-dimethyl)carboxamide oxalate melting at about 203–204° C.

*Example 99*

To a stirred mixture of 4.12 parts of 4-phenyl-4-carboxypiperidine pyrrolidide, 4.9 parts of sodium carbonate, 0.1 part of potassium iodide, and 60 parts of 4-methyl-2-pentanone is added portionwise a solution of 3.9 parts of δ-chlorovalerophenone in 60 parts of 4-methyl-2-pentanone. The mixture is refluxed for 45 hours, cooled, washed with water, dried, and evaporated. The residue is dissolved in methanol. To this solution is added a methanolic solution of oxalic acid. After chilling the solution at −20° C. the solid which precipitates is collected on a filter and then recrystallized from a 4:1 mixture of acetone and methanol to yield 1-(δ-benzoylbutyl)-4-phenyl-4-carboxypiperidine pyrrolidide oxalate melting at about 187–188° C.

By substituting the appropriate starting materials in the above procedure, 1-(γ-benzoylpropyl)-4-(3-chlorophenyl)-4-carboxypiperidine pyrrolidide oxalate melting at about 208–209.3° C. is obtained.

Example 100

By substituting 2-xylene and 4-xylene in the procedure of Example 1, γ-chloro-2,4-dimethylbutyrophenone boiling at about 140–146° C. at 5 mm. pressure and γ-chloro-2,5-butyrophenone boiling at about 142–148° C. at 7 mm. pressure are obtained.

A mixture of 4.2 parts of γ-chloro-2,5-dimethylbutyrophenone, 6 parts of 4-phenyl-4-carboxypiperidine pyrrolidide, 12 parts of sodium carbonate, 0.1 part of potassium iodide in 280 parts of 4-methyl-2-pentanone is refluxed for 59 hours and then filtered. The filtrate is evaporated and the residue dissolved in 2-propanol. To this solution is added oxalic acid in 2-propanol. The precipitate is collected on a filter, washed with acetone, and then recrystallized from methanol to yield 1-[γ-(2,5-dimethylbenzoyl)propyl]-4-phenyl-4-carboxypiperidine pyrrolidide oxalate melting at about 183.6–184° C.

By substituting appropriate starting materials in the above procedure, 1-[γ-(2,4-dimethylbenzoyl)propyl]-4-phenyl-4-carboxypiperidine pyrrolidide oxalate melting at about 186.5–187.5° C. is obtained. In a similar manner 1-[γ-(2,4-dimethylbenzoyl)propyl]-4-(4-tolyl)-4-carboxypiperidine pyrrolidide oxalate is obtained.

Example 101

A mixture of 5 parts of γ,4-dichlorobutyrophenone, 6 parts of 4-phenyl-4-carboxypiperidine pyrrolidide, 12 parts of sodium carbonate, 0.1 part of potassium iodide, and 280 parts of 4-methyl-2-pentanone is refluxed for 69 hours and then filtered. The filtrate is evaporated and the residue dissolved in 2-propanol. To this solution is added oxalic acid in 2-propanol. The solid which precipitates is collected on a filter and then triturated with acetone to yield 1-[γ-(4-chlorobenzoyl)propyl]-4-phenyl-4-carboxypiperidine pyrrolidide oxalate melting at about 202.5–203.5° C.

What is claimed is:
1. A compound of the formula

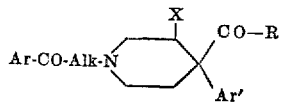

wherein Alk is a lower alkylene radical of at least 3 carbon atoms; Ar is a member of the class consisting of phenyl, lower alkylphenyl, xylyl, halophenyl, methoxyphenyl, and thienyl; Ar' is a member of the class consisting of phenyl, lower alkylphenyl, xylyl, halophenyl, methoxyphenyl, and trifluoromethylphenyl; R is a member of the class consisting of $NH_2$, NH-(lower alkyl), N(lower alkyl)$_2$, anilino, N($CH_3$)-phenyl, benzylamino, pyrrolidino, piperidino, morpholino, methylmorpholino, dimethylmorpholino, piperazino, and phenylpiperazino; and X is a member of the class consisting of hydrogen and methyl radicals.

2. A compound of the formula

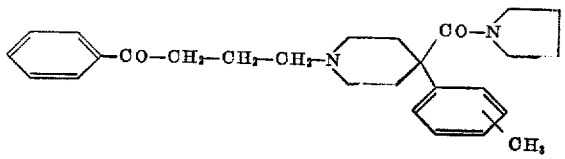

3. 1-(γ-benzoylpropyl)-4-(4-tolyl)-4-carboxypiperidine pyrrolidide.

4. A compound of the formula

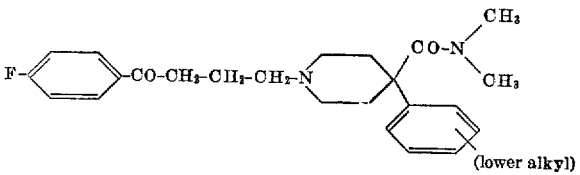

5. 1-[γ-(4-fluorobenzoyl)propyl]-4-(3-tolyl)piperidine-4-(N,N-dimethyl)carboxamide.

6. A compound of the formula

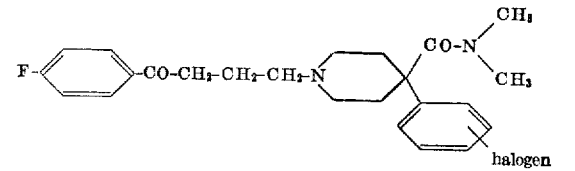

7. 1-[γ-(4-fluorobenzoyl)propyl]-4-(4-chlorophenyl)piperidine-4-(N,N-dimethyl)carboxamide.

8. A compound of the formula

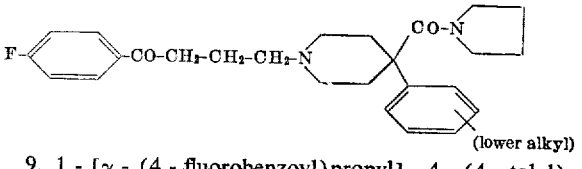

9. 1-[γ-(4-fluorobenzoyl)propyl]-4-(4-tolyl)-4-carboxypiperidine pyrrolidide.

10. 1-[γ-(4-fluorobenzoyl)propyl]-4-(3-tolyl)-4-carboxypiperidine pyrrolidide.

11. A compound of the formula

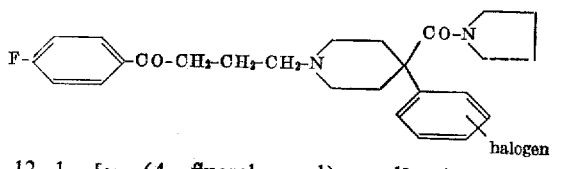

12. 1-[γ-(4-fluorobenzoyl)propyl]-4-(3-methoxyphenyl)-4-carboxypiperidine pyrrolidide.

13. A compound of the formula

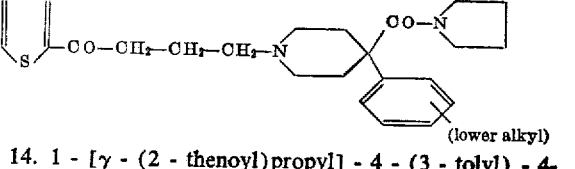

14. 1-[γ-(2-thenoyl)propyl]-4-(3-tolyl)-4-carboxypiperidine pyrrolidide.

15. 1-[γ-(4-fluorobenzoyl)propyl]-4-(2,4-xylyl)piperidine-4-(N,N-dimethyl)carboxamide.

16. 1-[γ-(4-fluorobenzoyl)propyl]-4-(3-chlorophenyl)-4-carboxypiperidine pyrrolidide.

References Cited in the file of this patent
UNITED STATES PATENTS

| | | |
|---|---|---|
| 2,167,351 | Eisleb | July 25, 1939 |
| 2,703,324 | Binkley et al. | Mar. 1, 1955 |
| 2,833,776 | Ruddy | May 6, 1958 |
| 2,846,437 | Elpern | Aug. 5, 1958 |
| 2,951,080 | Pohland | Aug. 30, 1960 |

UNITED STATES PATENT OFFICE
CERTIFICATE OF CORRECTION

Patent No. 3,097,209                      July 9, 1963

Paul A. J. Janssen

It is hereby certified that error appears in the above numbered patent requiring correction and that the said Letters Patent should read as corrected below.

Column 4, line 54, for "117" read -- 177 --; column 6, line 15, for "-toluenesulfonyl-" read -- -toluenesulfonyl)- --; line 43, for "167.5°" read -- 167.6° --; column 14, line 41, for "patassium" read -- potassium --; column 21, line 42, for "either" read -- ether --; same column 21, lines 51 to 59, the extreme lower right-hand portion of the formula, for "—CH" read -- —CH$_3$ --; column 28, line 37, for "-fluorobuyrophenone" read -- -fluorobutyrophenone --.

Signed and sealed this 31st day of March 1964.

(SEAL)
Attest:
ERNEST W. SWIDER                      EDWARD J. BRENNER

Attesting Officer                      Commissioner of Patents